(12) United States Patent
Winn, III et al.

(10) Patent No.: US 12,014,133 B2
(45) Date of Patent: Jun. 18, 2024

(54) SYSTEM AND METHOD FOR XBRL REVIEW

(71) Applicant: WORKIVA INC., Ames, IA (US)

(72) Inventors: David Baker Winn, III, Buena Vista, CO (US); Thomas Joseph Wacha, Ames, IA (US); Dana Andrew Oredson, Des Moines, IA (US); Taylor Wertzberger, Ames, IA (US); Kevin Fox, Ankeny, IA (US); Shaun Brockhoff, Ankeny, IA (US); Christopher Flores, Norwalk, IA (US); Kirsten Baxter-Tjaden, Ames, IA (US); Edward Joseph Cupps, Annapolis, MD (US); Jason Carl Jones, Urbandale, IA (US)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 18/486,753

(22) Filed: Oct. 13, 2023

(65) Prior Publication Data
US 2024/0126980 A1 Apr. 18, 2024

Related U.S. Application Data

(60) Provisional application No. 63/416,162, filed on Oct. 14, 2022.

(51) Int. Cl.
*G06F 40/143* (2020.01)
*G06F 3/048* (2013.01)
*G06F 40/166* (2020.01)

(52) U.S. Cl.
CPC ............ *G06F 40/143* (2020.01); *G06F 3/048* (2013.01); *G06F 40/166* (2020.01)

(58) Field of Classification Search
CPC ............................ G06F 40/143; G06F 40/166
See application file for complete search history.

(56) References Cited

U.S. PATENT DOCUMENTS

| | | | |
|---|---|---|---|
| 10,853,557 B2 * | 12/2020 | Konnola | G06Q 10/101 |
| 2006/0085738 A1 * | 4/2006 | Chapus | G06F 40/197 715/255 |
| 2009/0222490 A1 * | 9/2009 | Kemp | G06F 16/93 |
| 2013/0262981 A1 * | 10/2013 | Haila | G06F 40/117 715/234 |
| 2014/0013204 A1 * | 1/2014 | Theis | G06F 16/84 715/255 |
| 2015/0365298 A1 * | 12/2015 | Siegel | G06Q 10/103 715/733 |

\* cited by examiner

*Primary Examiner* — Asher D Kells
(74) *Attorney, Agent, or Firm* — Faegre Drinker Biddle & Reath LLP

(57) ABSTRACT

Provided is a method for review of an XBRL document. An XBRL document is received followed by a request to create an XBRL review for the XBRL document. A selection of an XBRL fact included in the XBRL document is received and a first review status, of a plurality of review statuses, is applied to the selected XBRL fact. The selected XBRL fact is monitored to detect a change to the XBRL fact, and in response to detecting a change to the XBRL fact, the first review status of the XBRL fact is updated to a second review status of the plurality of review statuses.

14 Claims, 44 Drawing Sheets

FIG. 2

Create XBRL Review 300

Use an XBRL Review with your team to designate a Review Status for your XBRL facts. When certain changes are made, Approved or Verified facts will be updated to Needs Review status. You can view details of changes that are not Verified or Approved, and use XBRL comments to discuss these changes or leave notes. Learn More

Review Name :

[Review name] — 310

System Labels

- Pending
  Default state for facts
- Needs Review
  System designated status for changes to a fact after being verified or approved by a user. Fact changes include, but are not limited to: Concept, Dimensions, Accuracy, Units, and other fact Options. Learn More

User Labels

- Flagged
  Discretionary Status
- Verified
  1st tier of Approval Process
- Approved
  2nd tier of Approval Process > Permissions

Private Review: Only users with a Workiva email address may access this review. Reviews created by customers are available to anyone with access to this XBRL Profile.

Cancel

Fact Details

Verified

410

Concept *

● Revenue from Contract with Customer, Excluding Assessed Tax

Dimensions

▢ Product and Service (Axis)

⊙ Product (Member)

Select Dimension

Fiscal Date * | 4/1/2021 - 6/30/2021
Source Value | 29392000
Fact Value | 29392000
Accuracy | -3 (Thousands) ▼
Units * | US Dollar ∨ Calculations = (C) Gross Profit + Create

XBRL Footnotes

Apply New

400
Fact Details
        
16 facts selected
○ 0    ○ 0    ● 0    ● 16    ● 0
Concepts *
↙ 410
- Cost of Goods and Services Sold    (12)
- Gross Profit    (4)
Dimensions
- Product and Service [Axis]    (8)
  - Product [Member]    (4)
  - Service [Member]    (4)
Select Dimension    (16)
Fiscal Date *   4/1/2021 - 6/30/2021    (4)
                4/1/2020 - 6/30/2020    (4)
                1/1/2021 - 6/30/2021    (4)
                1/1/2020 - 6/30/2020    (4)
Source Value    Multiple Selected
Fact Value      Multiple Selected
Accuracy        -3 (Thousands) ▼    (16)
Units *         US Dollar    (16)
FIG. 5C 400
Fact Details
       
12 facts selected
 0  0  0  12  0
Concepts *
- Revenue from Contract with Customer, Excluding ...  (12)
—410
Dimensions
   Product and Service [Axis]  (8)
      Product [Member]  (4)
      Service [Member]  (4)
Select Dimension  (12)
| Fiscal Date * | 4/1/2021 - 6/30/2021 | (3) |
| | 4/1/2020 - 6/30/2020 | (3) |
| | 1/1/2021 - 6/30/2021 | (3) |
| | 1/1/2020 - 6/30/2020 | (3) |
| Source Value | Multiple Selected | |
| Fact Value | Multiple Selected | |
| Accuracy | -3 (Thousands) ▼ | (12) |
| Units * | US Dollar | (12) |
FIG. 6C

400

Fact Details

710

12 facts selected

○ 0    ● 2    ◐ 2    ● 2    ✓ 6

410

Concepts

• Revenue from Contract with Customer, Excluding ... (12)

Dimensions

▢ Product and Service [Axis] (8)

◉ Product [Member] (4)

◉ Service [Member] (4)

| Select Dimension | (12) |

Fiscal Date | 4/1/2021 - 6/30/2021 | (3)
| 4/1/2020 - 6/30/2020 | (3)
| 1/1/2021 - 6/30/2021 | (3)
| 1/1/2020 - 6/30/2020 | (3)

Source Value  Multiple Selected

Fact Value  Multiple Selected

Accuracy  -3 (Thousands) ▼  (12)

Units  US Dollar  (12)

FIG. 7A

400 — Fact Details

4 of 12 facts selected
  2  2  2  6
Concepts *
— 410
- Revenue from Contract with Customer, Excluding A... (4)
Dimensions
- Product and Service [Axis] (4)
  - Product [Member] (2)
  - Service [Member] (2)
Select Dimension (4)
| Fiscal Date * | 4/1/2021 - 6/30/2021 | (2) |
| | 4/1/2020 - 6/30/2020 | (2) |
| Source Value | Multiple Selected | |
| Fact Value | Multiple Selected | |
| Accuracy | -3 (Thousands) ▾ | (4) |
| Units * | US Dollar | (4) |
FIG. 7C

Fact Details

4 of 12 facts selected 0  2  2  2  6

Concepts

— 410

- Revenue from Contract with Customer, Excluding A... (4)

Dimensions

- Product and Service [Axis] (4)
  - Product [Member] (2)
  - Service [Member] (2)

Select Dimension (4)

Fiscal Date * 4/1/2021 - 6/30/2021 (2)

4/1/2020 - 6/30/2020 (2)

Source Value  Multiple Selected

Fact Value  Multiple Selected

Accuracy  -3 (Thousands) ▼ (4)

Units *  US Dollar (4)

FIG. 8B

Fact Details

12 facts selected

Concepts
- Revenue from Contract with Customer, Excluding ... (12)

Dimensions
- Product and Service [Axis] (8)
  - Product [Member] (4)
  - Service [Member] (4)

Select Dimension (12)

| | | |
|---|---|---|
| Fiscal Date | 4/1/2021 - 6/30/2021 | (3) |
| | 4/1/2020 - 6/30/2020 | (3) |
| | 1/1/2021 - 6/30/2021 | (3) |
| | 1/1/2020 - 6/30/2020 | (3) |
| Source Value | Multiple Selected | |
| Fact Value | Multiple Selected | |
| Accuracy | -3 (Thousands) | (12) |
| Units | US Dollar | (12) |

Fact Details

Concept *
- Financing Receivable, after Allowance for Credit Loss

Dimensions

[ Select Dimension ]

Fiscal Date * 6/30/2021
Source Value  205262000
Fact Value    205262000
Accuracy      -3 (Thousands)
Units *       US Dollar ∨ Calculations + Create

XBRL Footnotes

Apply New

∨ Fact Options

FIG. 11D

Details

View Changes — 1310

Concept
- Revenue from Contract with Customer, E...

Dimensions

☐ Product and Service [Axis]
  ☐ Product [Member]
    Select Dimension

Fiscal Date: 4/1/2020 - 6/30/2020

Changed From

Fact Status
⊗ Approved

Concept
* Proceeds from (Repayments of)
  Secured Debt

Dimensions
(None Applied)

Accuracy
-5 Hundred Thousands

*Changes Initiated by Judith Everett*
*Dec. 2, 2021 3:35 PM*

SYSTEM AND METHOD FOR XBRL REVIEW

CROSS-REFERENCE TO RELATED APPLICATIONS

This application claims the priority benefit of U.S. Provisional Patent Application No. 63/416,162, filed on Oct. 14, 2022, which is incorporated herein by reference in its entirety.

TECHNICAL FIELD

The present disclosure relates to reporting of business data in documents using the XBRL (eXtensible Business Reporting Language), and more particularly to systems and methods for reviewing XBRL facts.

BACKGROUND

XBRL is a standardized computer language by which businesses may efficiently and accurately communicate business data with each other and with regulating agencies. Extensible Business Reporting Language (XBRL) 2.1 is available at http://www.xbrl.org/Specification/XBRL-2.1/REC-2003-12-31/XBRL-2.1-REC-2003-12-31+corrected-errata-2013-02-20.html. XBRL is a markup language not too dissimilar from XML (eXtensible Markup Language) and HTML (Hyper Text Markup Language). HTML was designed to display general-purpose data in a standardized way, XML was designed to transport and store general-purpose data in a standardized way, and XBRL was designed to transport and store business data in a standardized way.

Taxonomies are the report and subject specific dictionaries used by the XBRL community. Taxonomies include specific tags, referred to as XBRL tags, which are used for individual items of data (e.g., "Revenues", "Operating expenses"), their attributes and their interrelationships. Different taxonomies are often required for different business reporting purposes.

XBRL is bringing about a dramatic change in the way people think about exchanging business information. Financial disclosures are a prime example of an industry built around a paper-based process that is being pushed into the technological age. This transition involves a paradigm shift from the pixel perfect world of building unstructured reports to a digital world where structured data is dominant.

SUMMARY

In an embodiment, a method for XBRL review comprises receiving an XBRL document; receiving a request to create an XBRL review for the XBRL document; receiving a selection of an XBRL fact included in the XBRL document; applying a first review status, of a plurality of review statuses, to the selected XBRL fact; monitoring the selected XBRL fact to detect a change to the XBRL fact; and in response to detecting a change to the XBRL fact, updating the first review status of the XBRL fact to a second review status of the plurality of review statuses.

In another embodiment, a method for XBRL review comprises receiving an XBRL document; receiving a request to view an XBRL review that has been created for the XBRL document; and displaying, for each of a plurality of review statuses, a number of XBRL facts in the XBRL document having that review status applied.

In another embodiment, a computing device comprises a processor configured to carry out a method comprising receiving an XBRL document; receiving a request to create an XBRL review for the XBRL document; receiving a selection of an XBRL fact included in the XBRL document; applying a first review status, of a plurality of review statuses, to the selected XBRL fact; monitoring the selected XBRL fact to detect a change to the XBRL fact; and in response to detecting a change to the XBRL fact, updating the first review status of the XBRL fact to a second review status of the plurality of review statuses.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

FIG. 2 illustrates an example user interface showing a portion of an XBRL report, according to an embodiment.

FIG. 3 is an example user interface showing the creation of an XBRL review, according to an embodiment.

FIGS. 4A-4C are example user interfaces showing a process of viewing details of a selected XBRL fact and applying a review status to the XBRL fact, according to an embodiment.

FIGS. 5A-5C are example user interfaces showing a process of updating review statuses of a group of selected XBRL facts, according to an embodiment.

FIGS. 6A-6C are example user interfaces showing a process of updating review statuses of a group of selected XBRL facts, according to an embodiment.

FIGS. 7A-7C are example user interfaces showing a process of applying filters to a group of selected XBRL facts, according to an embodiment.

FIGS. 8A and 8B are example user interfaces showing a process of applying filters to a group of selected XBRL facts, according to an embodiment.

FIGS. 9A-9C are example user interfaces showing a process of updating review statuses of a filtered set of XBRL facts, according to an embodiment.

FIGS. 11A-11D are example user interfaces showing an outline of an XBRL file and an XBRL review of the file, according to an embodiment.

FIGS. 13A and 13B are example user interfaces showing details about a selected XBRL fact and changes made to the selected XBRL fact, according to an embodiment.

FIG. 23 is an example user interface showing the ability to configure the display of comment indicators, according to an embodiment.

DETAILED DESCRIPTION

Figure 1:
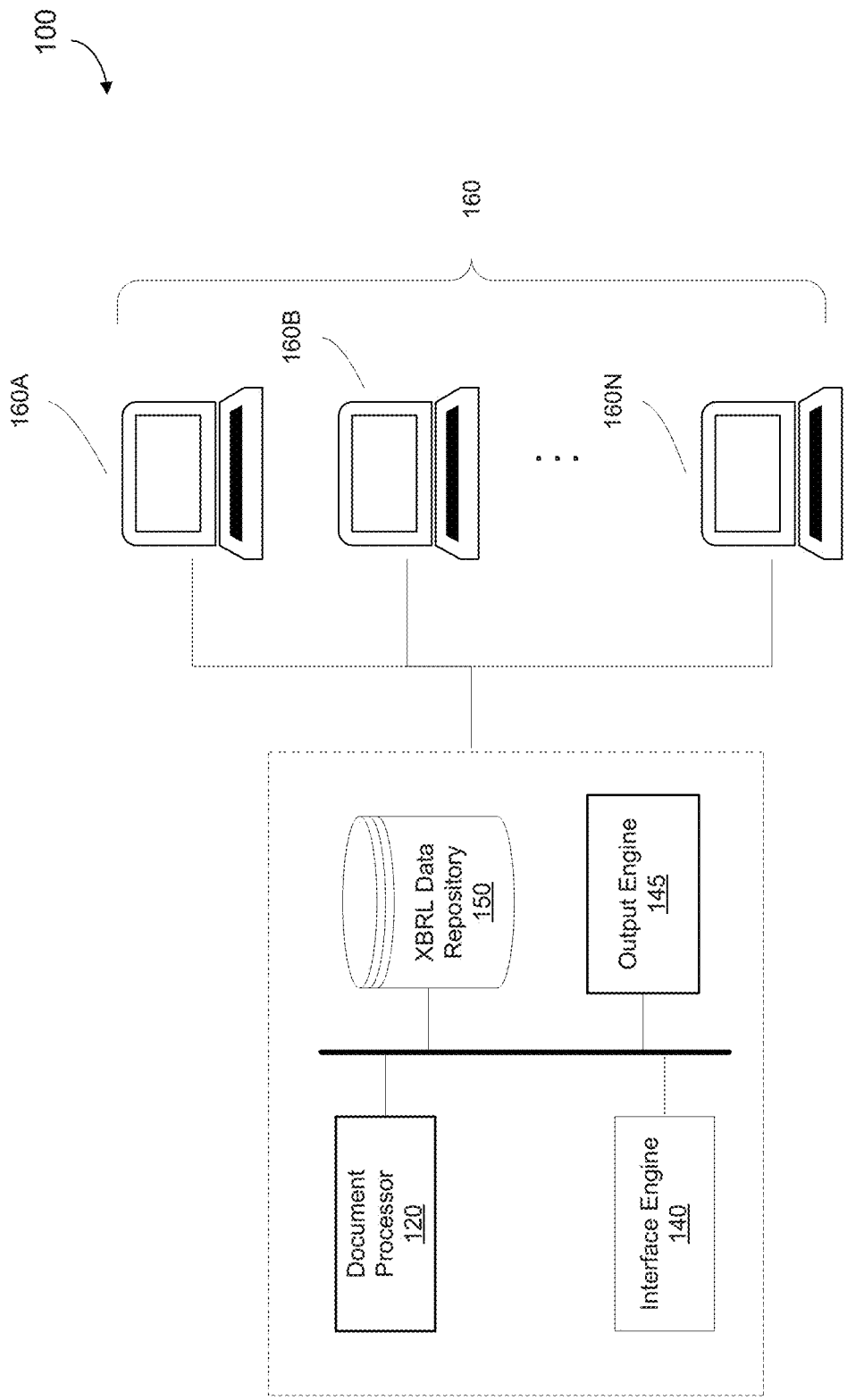
FIG. 1 is an example of a networking environment in which various embodiments of the disclosure may be implemented, according to an embodiment.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

The XBRL review system of the present disclosure is designed for teams of users to have a central place that they can establish a process of bringing their XBRL facts through a two-tiered verification and approval process.

The XBRL review system of the present disclosure is centered on XBRL facts. An XBRL fact (sometimes referred to herein simply as a "fact") is an individual piece of information in an XBRL document. An XBRL fact is represented by reporting a value against a concept (e.g., assets, profit, etc.), and associating the value with a number of dimension values (e.g., units, period, entity, or other dimensions) that together uniquely define a data point.

In an embodiment, the XBRL review system provides the user with the ability to set a review status for a selected XBRL fact. For example, by selecting a particular fact in the XBRL document, the user is able to review all of the associated tagging for the selected fact. Once the user has reviewed all of the tagging for the selected fact, the user may set or update a review status for the fact. This review status is then made visible to other users (e.g., collaborators) who are also viewing the XBRL document. In an embodiment, the user may designate a review status of "flagged", "verified", or "approved". In one embodiment, there may also be additional and/or alternative review statuses that may be applied to facts. For example, when an XBRL review is first created for an XBRL document, all facts that are present in the XBRL document may be designated with a default review status of "pending".

In another example, once a fact has been designated as "verified" or "approved", the system monitors that fact for changes and, whenever a change to the fact occurs, the system will automatically update the review status of that fact to "needs review". This will signal to the reviewers that something has changed that needs to be looked at. The XBRL Review panel will navigate the user directly to the fact that needs review, and a Fact Details panel (described in greater detail herein) will give the user the ability to view the details of what has changed with respect to the fact, including, for example, when the change occurred, by whom the change was made, and the like. For example, for a fact that was previously verified or approved, and then is subsequently changed, the system may identify (e.g., highlight or otherwise designate) the component of that fact that was changed. This provides the user with an easy way to determine why the fact that they previously verified or approved is now appearing in the system as "needs review".

The user can also see how that component of the fact was changed. For example, the user can be provided with a view of the fact as it was verified or approved, together with a view of how that fact subsequently changed. The user can then designate (or redesignate) a status for the fact based on their review of the change.

FIG. 1 depicts an illustrative system diagram of an XBRL review system 100, in accordance with certain embodiments of the present disclosure. As illustrated, the system 100 includes a document processor 120, an interface engine 140, an output engine 145, and an XBRL data repository 150. One or more components of the system 100 are optional. In some cases, the system 100 can include additional components. In some cases, the system 100 interfaces with one or more other systems 160, for example, a filing system, a finance system, a vendor system, and/or the like.

In some embodiments, the document processor 120 includes natural language processing functionalities. In some cases, the document processor 120 parses the received documents into n-grams and generate a plurality of terms based on the n-grams. As used herein, n-gram refers to a contiguous sequence of n words including numbers and symbols from a data stream, which typically is a phrase or a sequence of words with meaning. N-gram can include numbers and symbols, such as a comma, a period, a dollar sign, and/or the like. In some cases, the document processor 120 normalizes the parsed n-grams. Further, in some cases, the document processor 120 generates a plurality of normalized sections having normalized terms based on the n-grams. In one example, the plurality of intake terms include normalized n-grams. As one example, the n-grams is a date and the normalized term is the date in a predefined format (e.g., year-month-date). In some cases, the document processor 120 determines contexts of the normalized terms. In one example, the contexts are a part of a same sentence of the normalized terms. In one example, the natural language processor 120 parses the n-grams and labels the n-grams based on the contexts, for example, period, expense, revenue, etc. In some embodiments, a document processor 120 uses a natural language model for processing the document and parsed n-grams. For example, a natural language model can be a statistical language model, a neural network language model, and/or the like.

In some embodiments, the interface engine 140 is configured to interface with other systems 160. In some embodiments, the interface engine 140 is configured to connect to an electronic filing system or a finance system 160 via a software interface. In some cases, the interface engine 140 is configured to use a set of predetermined protocol through the software interface. In some cases, the software interface comprises at least one of an application programming interface and a web service interface.

In some embodiments, the output engine 145 is configured to generate a representation of XBRL document, suggested/predicted XBRL tags, labels of suggested/predicted XBRL tags, and/or tag confidence values. In some cases, a representation indicative of an XBRL tag includes a representation of a label associated with the tag. In some cases, the graphical user interface is received by a client application and rendered on a computing device of a user. In some cases, the output engine 145 is configured to receive inputs or requests submitted by users. In some cases, the output engine 145 can be configured to render representations to users. In some cases, the output engine 145 receives a type of a computing device (e.g., laptop, smart phone, tablet computer, etc.) of the user and is configured to generate a graphical presentation adapted to the computing device type.

In some embodiments, the representation of the tag confidence values includes an indication of corresponding categories of the tag confidence values. In one example, the tag confidence categories are represented by colors. For example, a high confidence category is represented by green, a medium confidence category is represented by yellow, and a low confidence category is represented by red. In one embodiment, an indication of a tag confidence category for each tag confidence value is included in the representation.

In some embodiments, the XBRL data repository 150 can include taxonomy data, XBRL datasets, suggested XBRL tags, selected XBRL tags, documents (including XBRL documents) received for analysis, and/or the like. The XBRL data repository 150 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the system 100 can execute software or firmware stored in non-transitory computer-readable medium to implement various processing steps. Various components and processors of the system 100 can be implemented by one or more computing devices, including but not limited to, circuits, a computer, a cloud-based processing unit, a processor, a processing unit, a microprocessor, a mobile computing device, and/or a tablet computer. In some cases, various components of the system 100 (e.g., the document processor 120, the interface engine 140, the output engine 145) can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the XBRL tag suggestion/validation system 100 can be implemented in software or firmware executed by a computing device.

Various components of the system 100 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2:
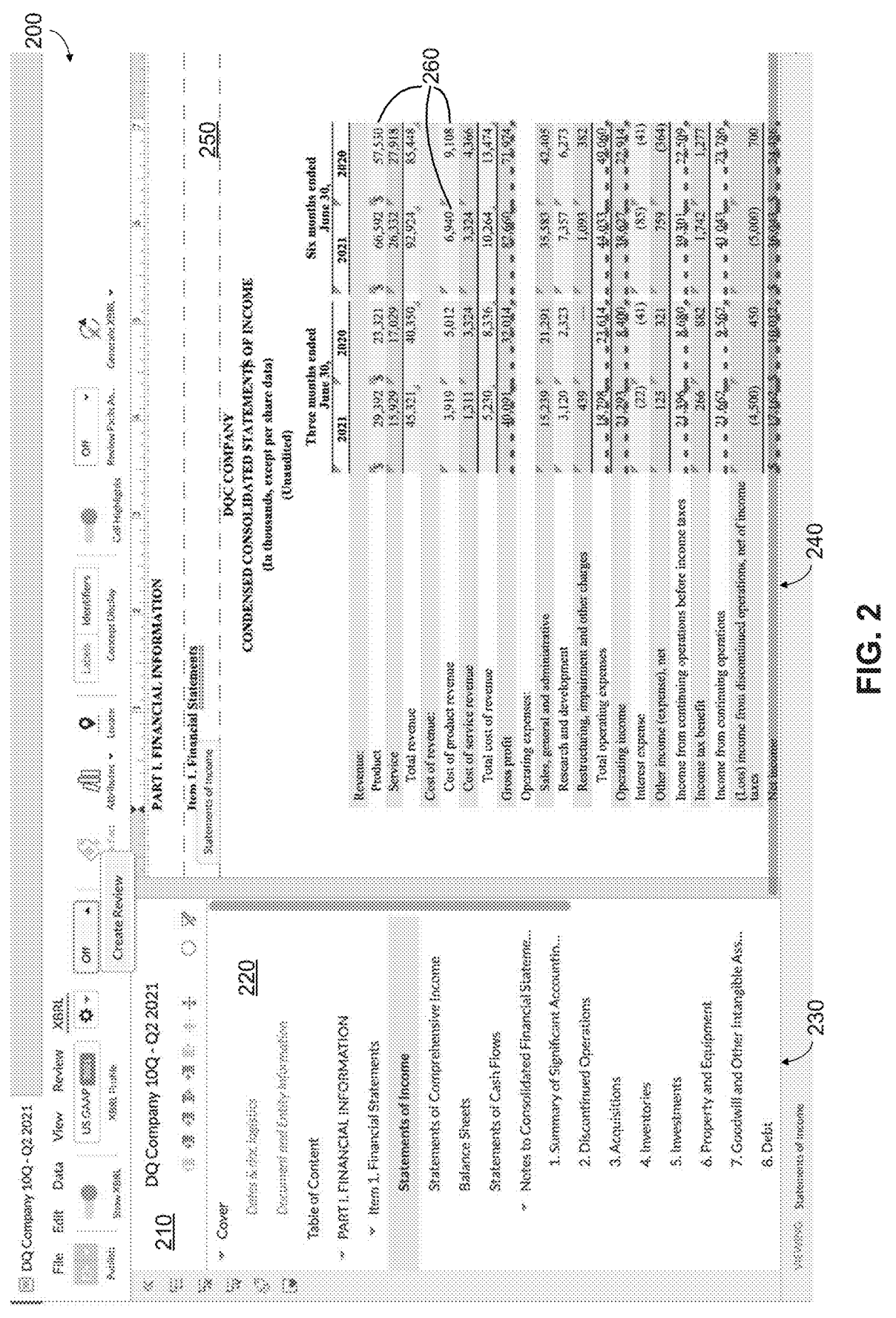

FIG. 2 illustrates an example user interface 200 showing a portion of an XBRL report (or file) 210. In the example user interface 200, an outline 220 of the XBRL report 210 is shown in the left presentation panel 230 of the user interface 200, and a section of the XBRL report (which in some instances may be considered an XBRL document) 250 is shown in the right presentation panel 240 of the user interface 200. The XBRL document 250 includes one or more XBRL facts 260.

Figure 4A:
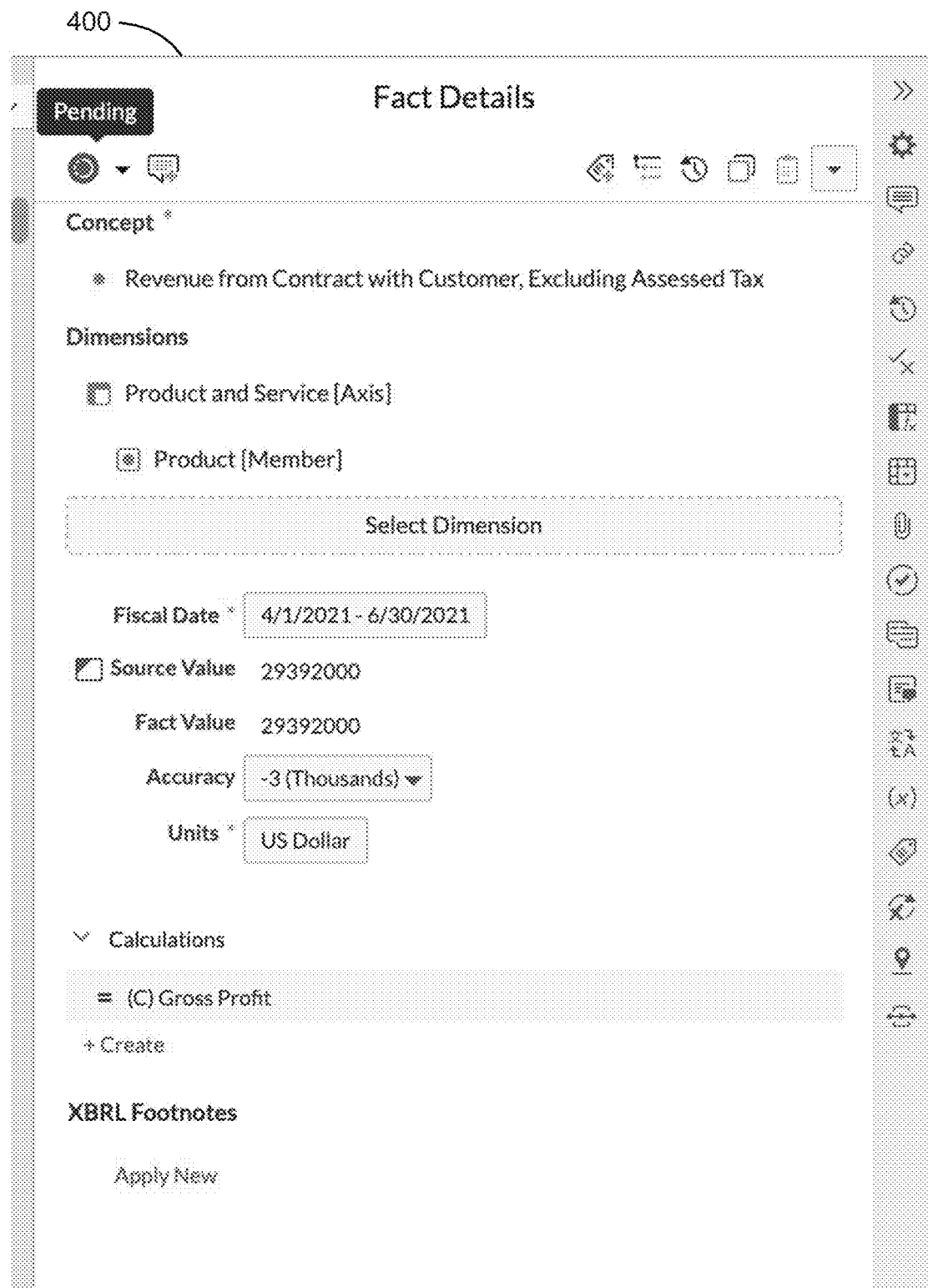
Figure 4B:
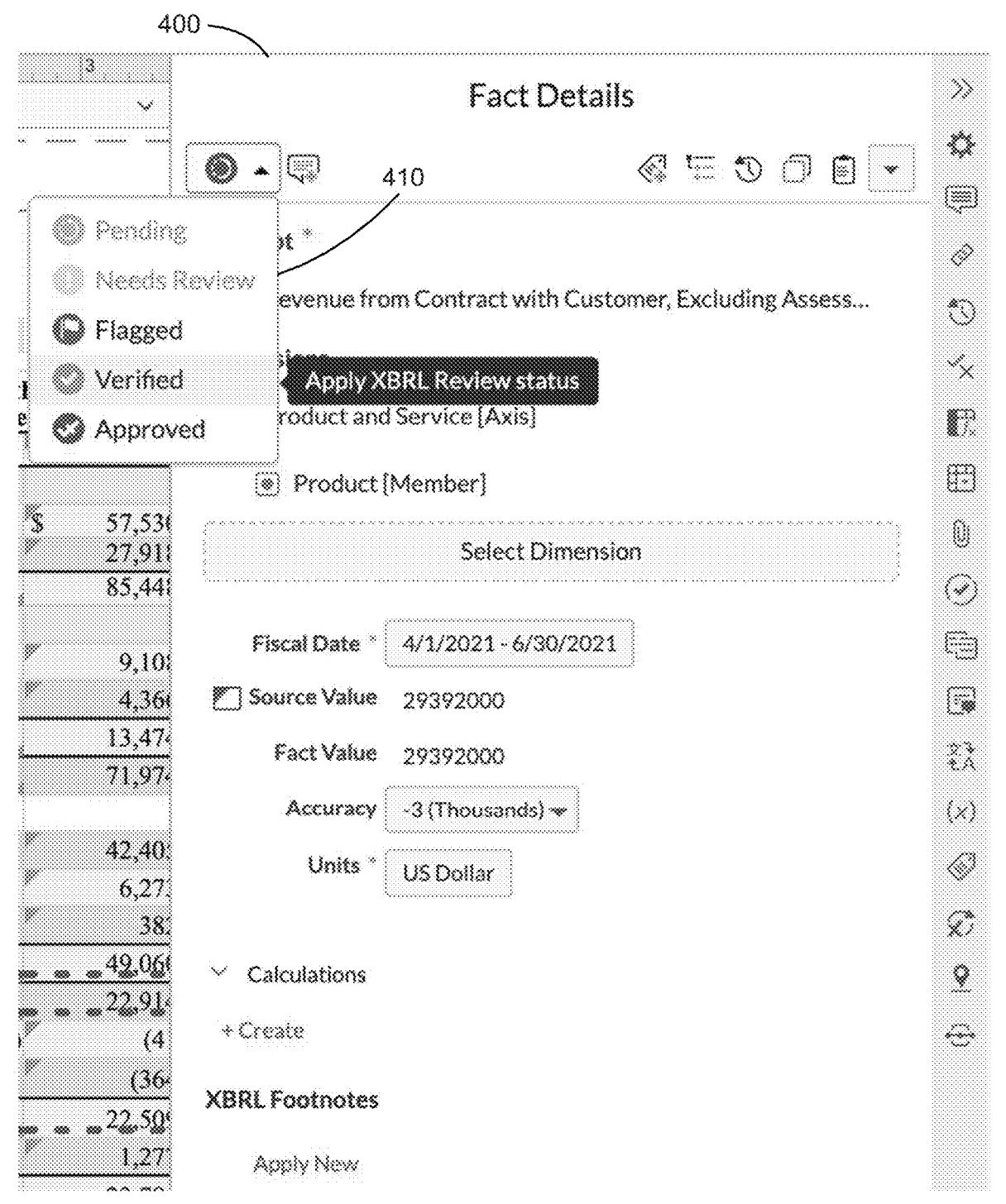

In an embodiment, a user is provided with the ability to create an XBRL review 300 for the XBRL report 200. In one example, a user may create an XBRL review 300 for one XBRL document 250 of the XBRL report 200. In another example, a user may create an XBRL review 300 across multiple XBRL documents 250 of the XBRL report 200. Upon receiving a request from the user to create an XBRL review 300, the user may be prompted to give the XBRL review 300 a name 310, as shown in FIG. 3. The user may then select a particular XBRL fact (e.g., XBRL fact 260) in the XBRL document 250. When the user selects an XBRL fact 260, a Fact Details panel 400 is generated on the user interface 200, an example of which is shown in FIGS. 4A-C. The Fact Details panel 400 provides the user with the ability to set a status (sometimes referred to as a "review status") 410 for the selected XBRL fact. For example, once the user has reviewed all of the tagging for the selected fact, the user may set or update the review status 410 for the fact. In an embodiment, the user may set the review status 410 for the selected fact to "verified" or "approved". In an example, if a first user is conducting a first review of a selected fact (e.g., the selected fact has a review status 410 of "pending"), the first user may, after reviewing the tagging for the selected fact, set the review status 410 of the fact to "verified". Thereafter, if a second user conducts a second review of that same fact, the second user may update the review status 410 for the fact from "verified" to "approved" to signal to others that the particular fact has been twice reviewed.

In an embodiment, when an XBRL review is initially created, all XBRL facts (e.g., XBRL facts 260) in the XBRL document 250 are set to an initial review status 410 of "pending". If, after an XBRL review has been initiated, a new XBRL fact is added to the XBRL document 250, that new XBRL fact is set to an initial review status of "pending".

Figure 5A:
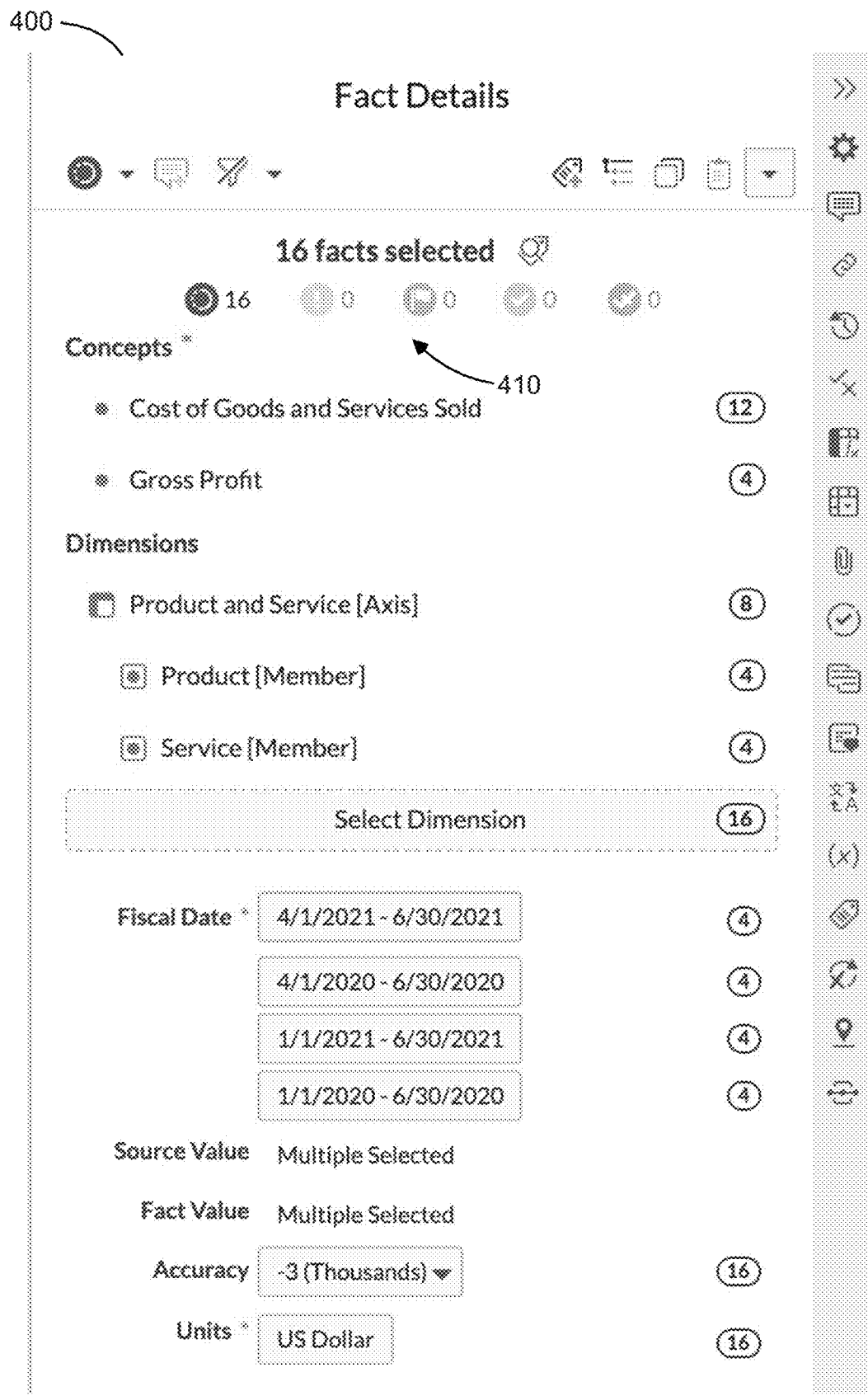
Figure 5B:
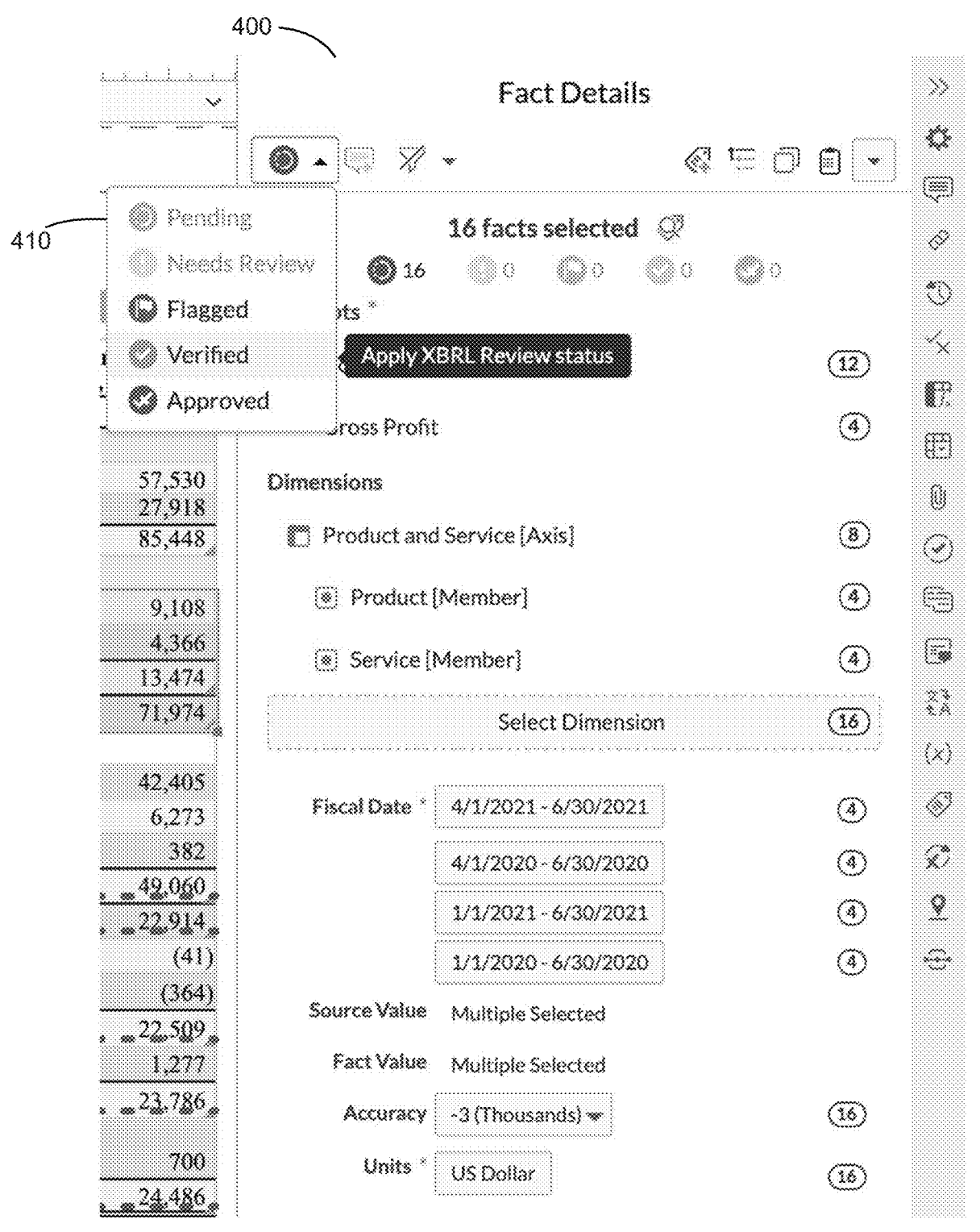

In an embodiment, the user may select multiple facts (e.g., multiple XBRL facts 260) having the same review status 410 and simultaneously update that status for all of the selected facts. In an example, the selected XBRL facts are all from the same XBRL document 250. In another example, the selected XBRL facts are from two or more XBRL documents 250. As shown in FIG. 5A, when the user selects a plurality of facts, the various review statuses 410 of those selected facts will appear in the Fact Details panel 400. In the example shown, sixteen facts are selected and all of those selected facts have the initial review status 410 of "pending". As shown in FIG. 5B, the user may simultaneously update the review statuses 410 of all of the selected facts. For example, the user may apply a status of "verified" to all of the selected facts. Once the user has updated the statuses of all of the selected facts, those selected facts will appear in the Fact Details panel 400 as having the updated status, which in the present example is "verified", as shown in FIG. 5C.

Figure 6A:
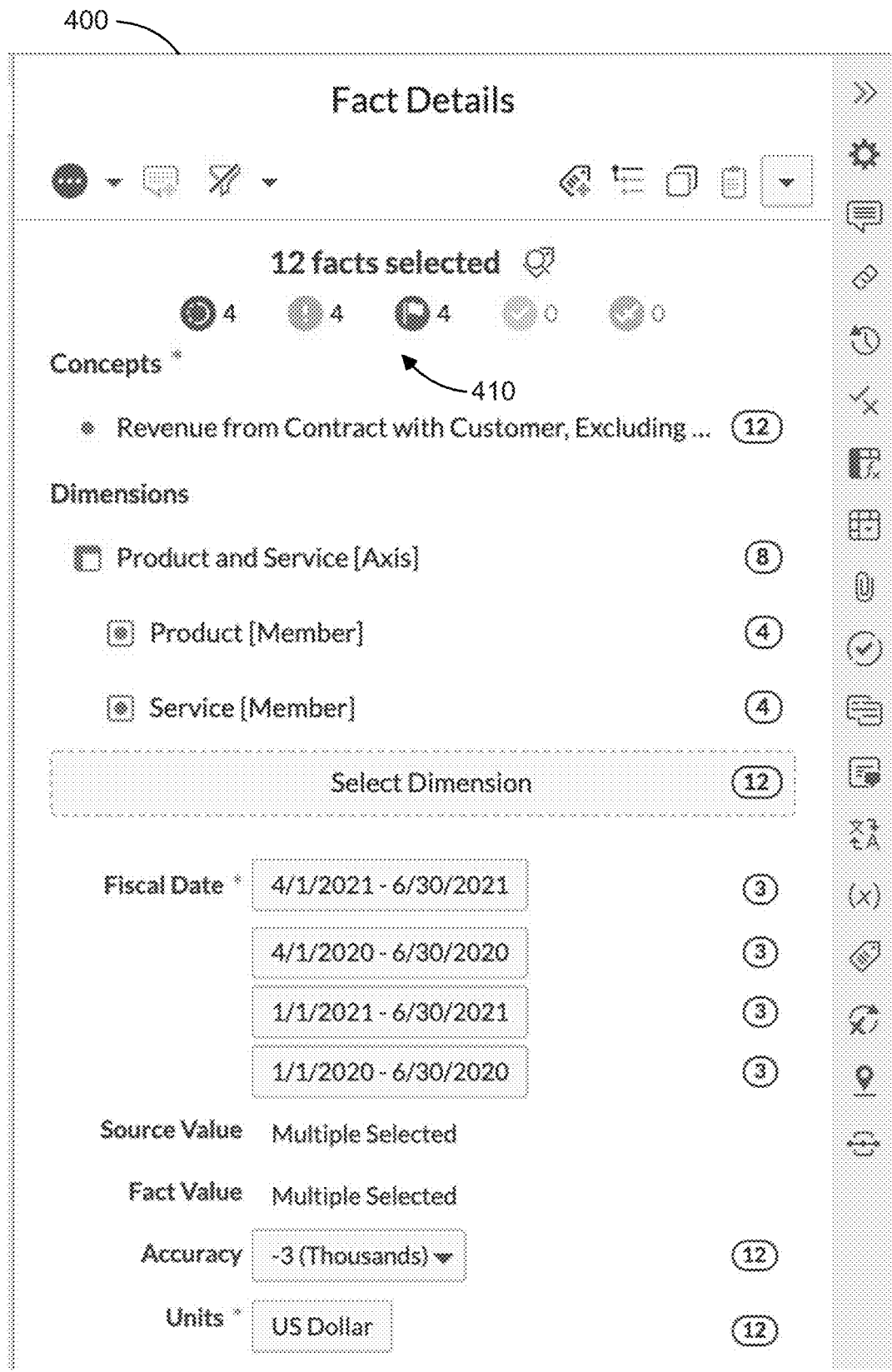
Figure 6B:
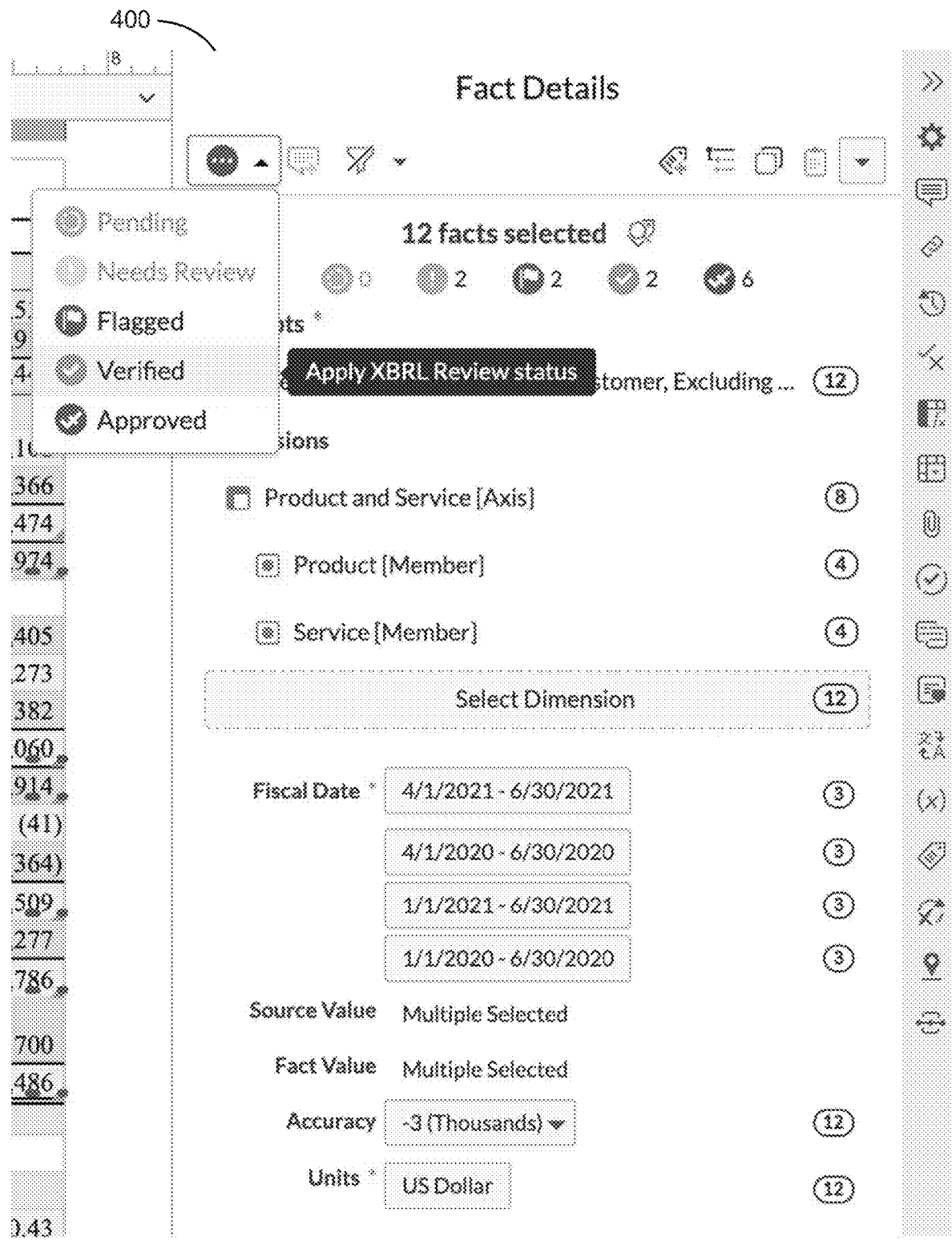

In an embodiment, the user may select multiple facts (e.g., multiple XBRL facts 260) having different review statuses 410 and simultaneously update those review statuses 410 for all of the selected facts. As shown in FIG. 6A, the user has selected twelve facts. Of those twelve facts, four facts have a status of "pending", four facts have a status of "needs review", and four facts have a status of "flagged". As shown in FIG. 6B, the user may simultaneously update the different review statuses of all of the selected facts. For example, the user may apply a status of "verified" to all of the selected facts. Once the user has updated the review statuses of all of the selected facts, those selected facts will appear in the Fact Details panel 400 as having the updated status, which in the present example is "verified", as shown in FIG. 6C.

Figure 7B:
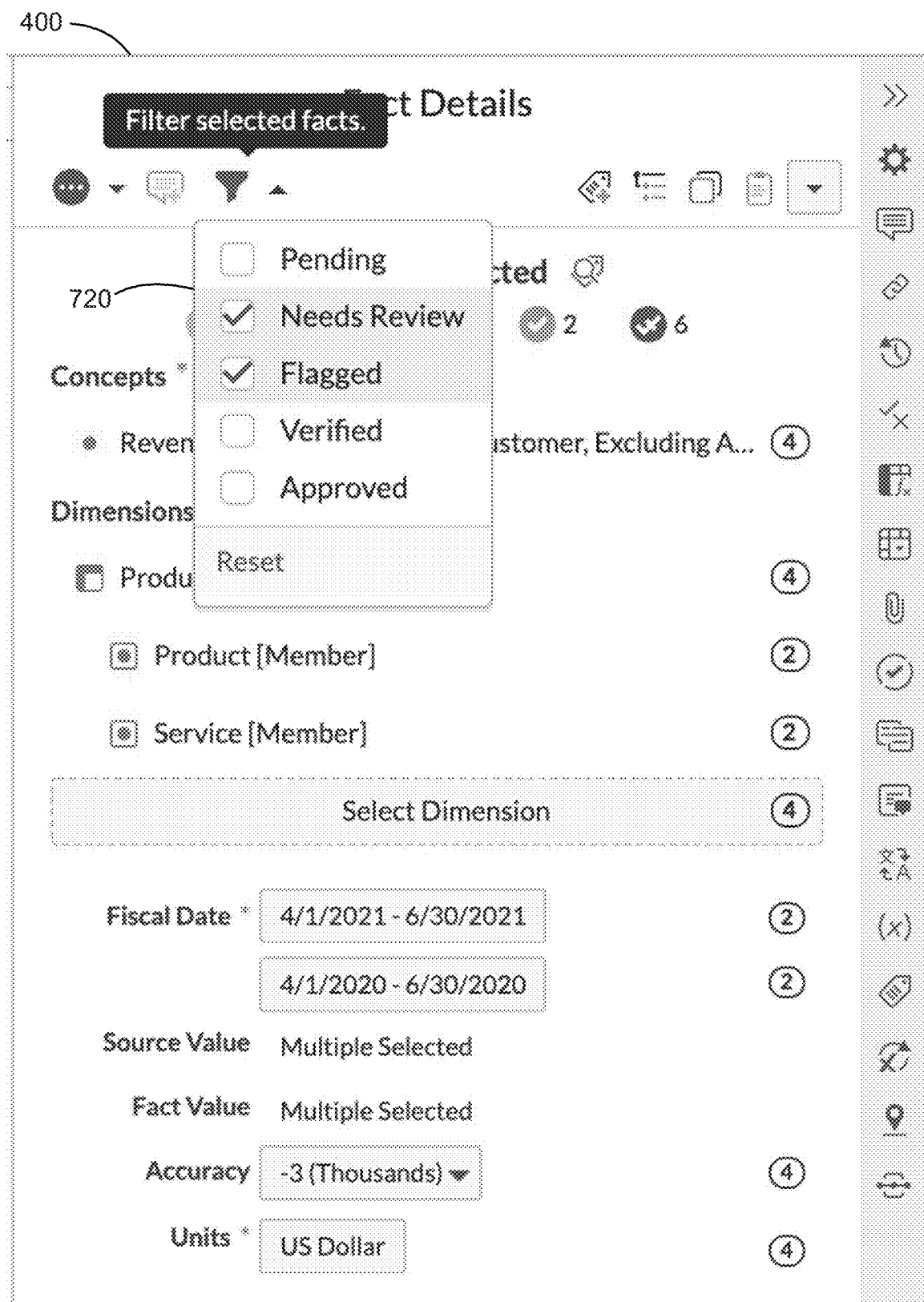

In an embodiment, a group of selected facts (e.g., XBRL fact 260) may be filtered according to their applied review status. In the example shown in FIG. 7A, the user has selected twelve facts, including two facts having the status "pending", two facts having the status "flagged", two facts having the status "verified", and six facts having the status "approved". As shown in FIGS. 7A and 7B, the Fact Details panel 400 may include a filter tool (e.g., a dropdown menu) 710 that allows the user to filter the selected facts based on their currently applied review status 410. After one or more filters 720 available in the filter tool 710 have been applied to the selected facts, only details about the resulting facts will appear in the Fact Details panel 400, as shown in FIG. 7C.

Figure 8A:
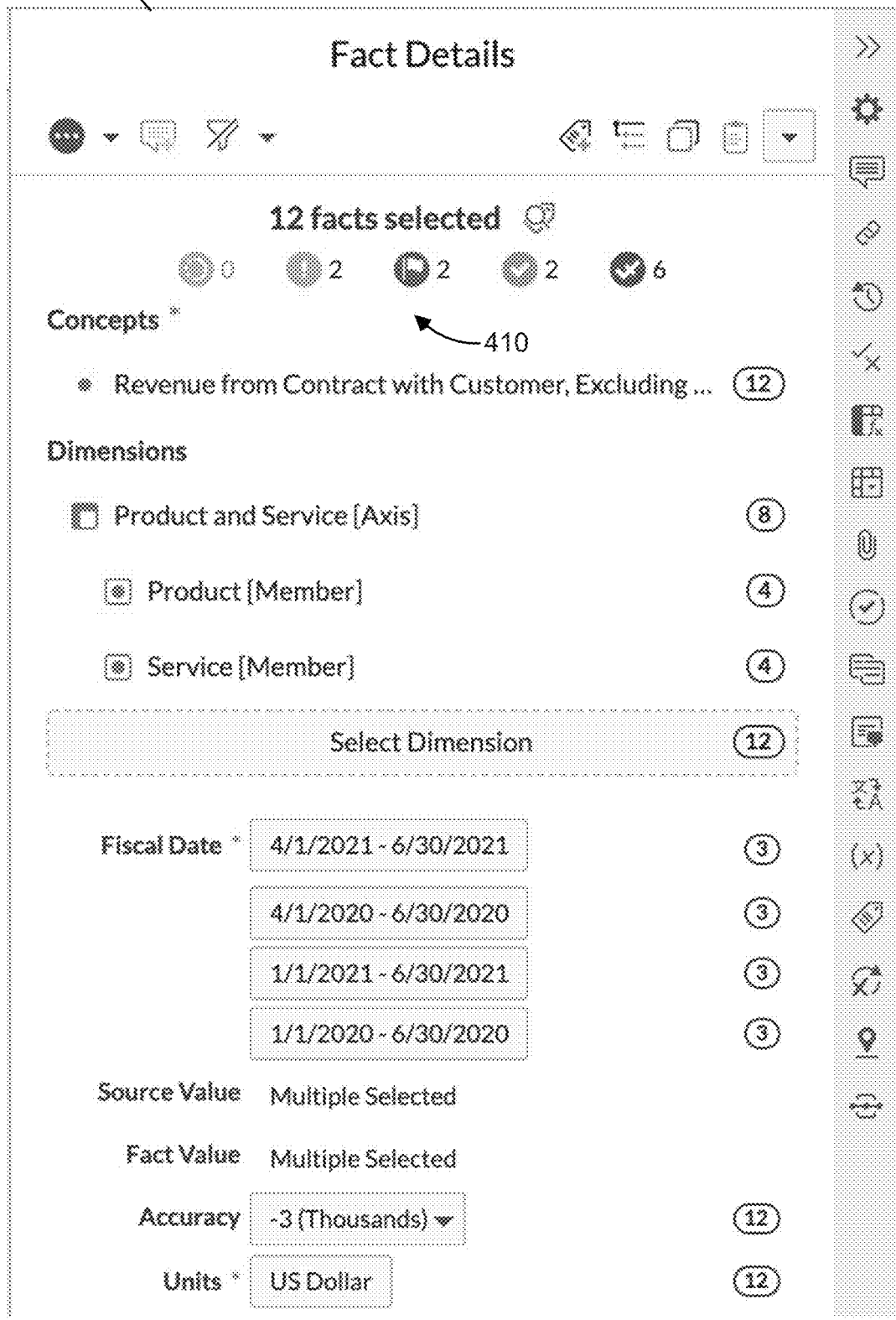

FIGS. 8A and 8B illustrate an example where filters 720 may be applied to a group of selected facts (e.g., XBRL fact 260) by selecting the corresponding review status 410 icons that appear in the Fact Details panel 400.

Figure 9A:
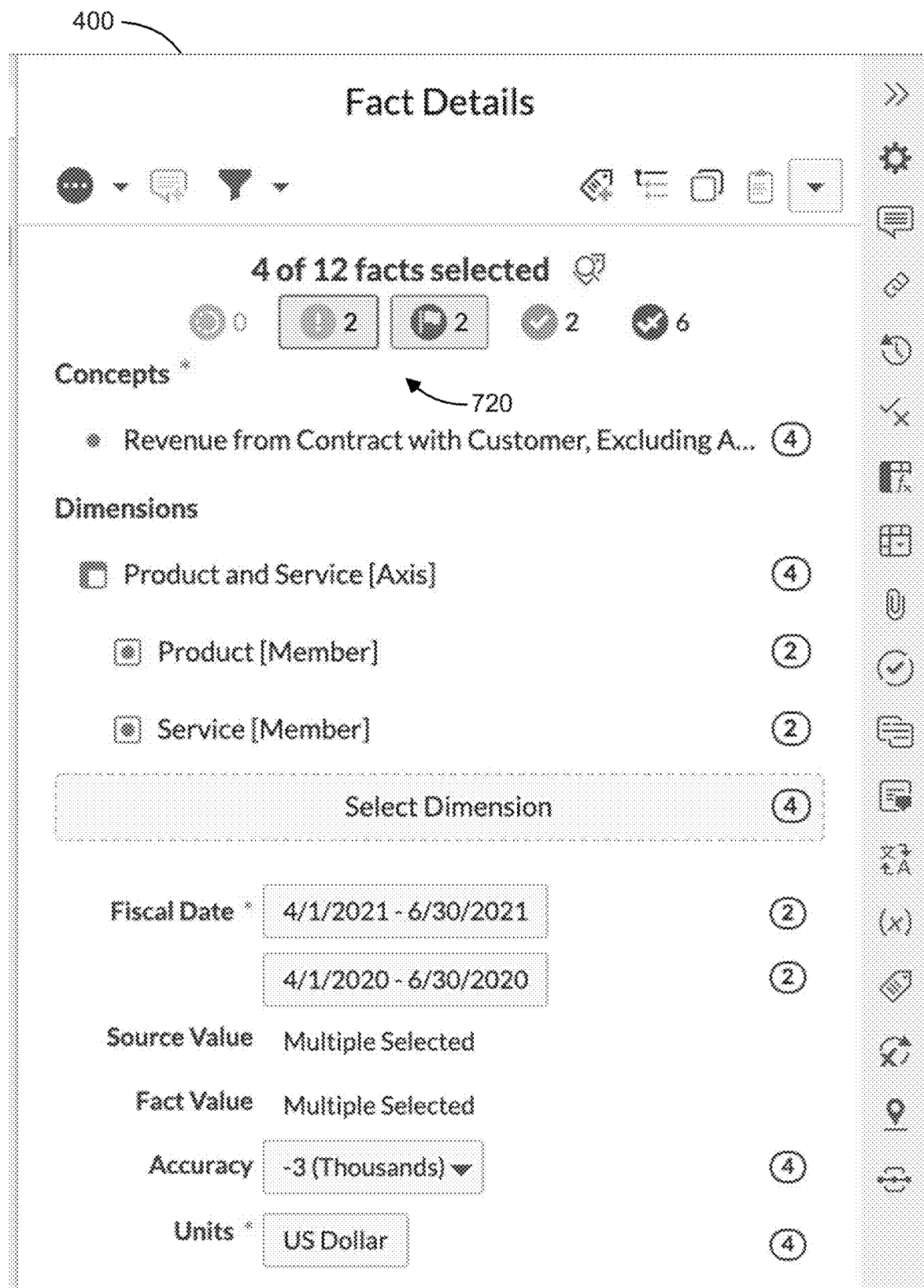
Figure 9B:
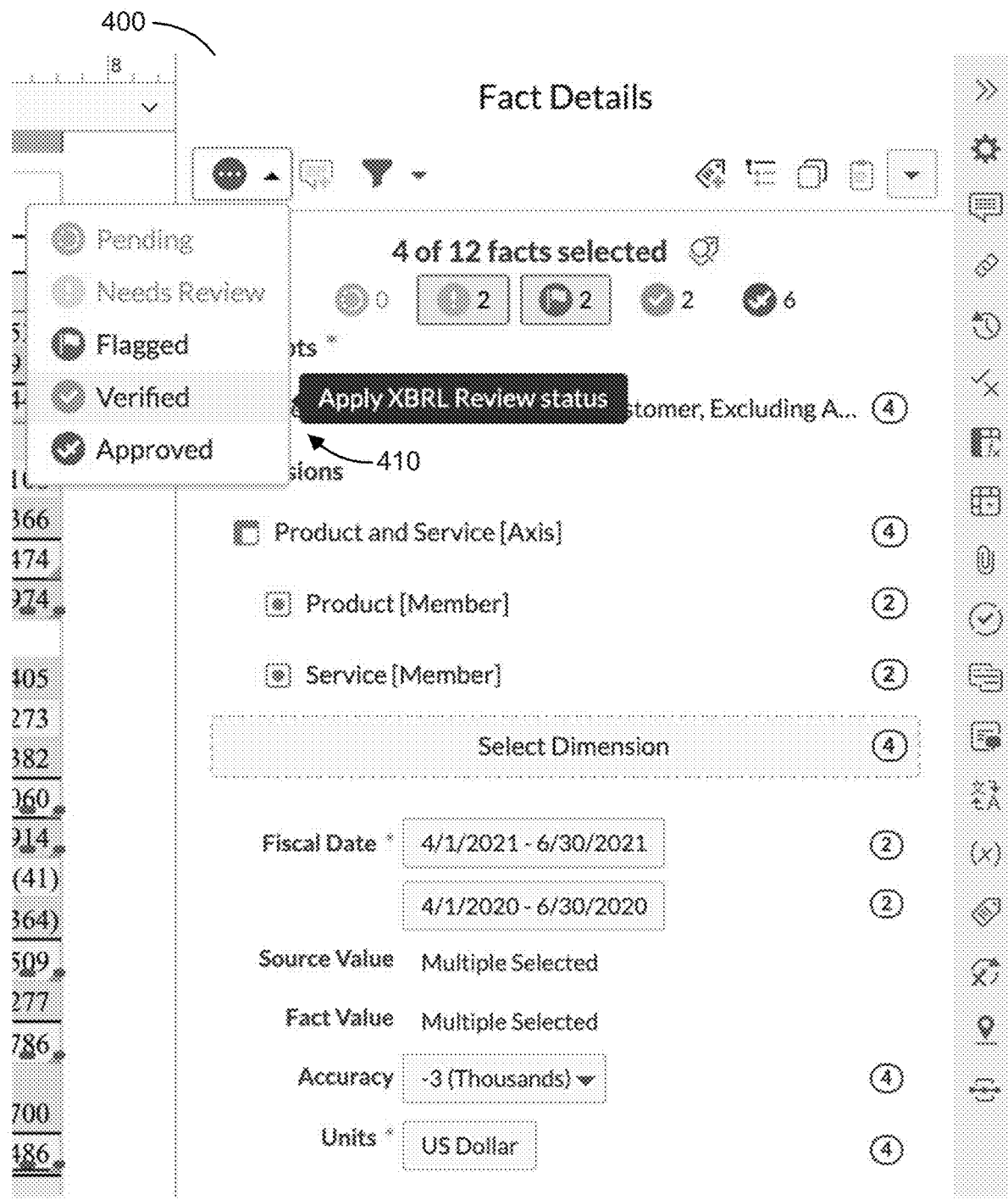

In an embodiment, the user may simultaneously update the review statuses 410 of a filtered set of facts (e.g., XBRL fact 260). As shown in FIG. 9A, the user has applied filters 720 to a group of twelve selected facts. In the example shown, the user has applied "needs review" and "flagged" review status filters 720 so that only the details of four facts out of the selected group of twelve facts appear in the Fact Details panel 400. As shown in FIG. 9B, the user may simultaneously update the statuses of these four filtered facts. For example, the user may apply a status of "verified" to the set of four filtered facts. Once the user has updated the statuses of the filtered set of facts to "verified", the previously applied filters (e.g., the "needs review" and "flagged" status filters) are no longer relevant. Therefore, as shown in FIG. 9C, all twelve of the selected facts appear in the Fact Details panel 400.

Figure 10:
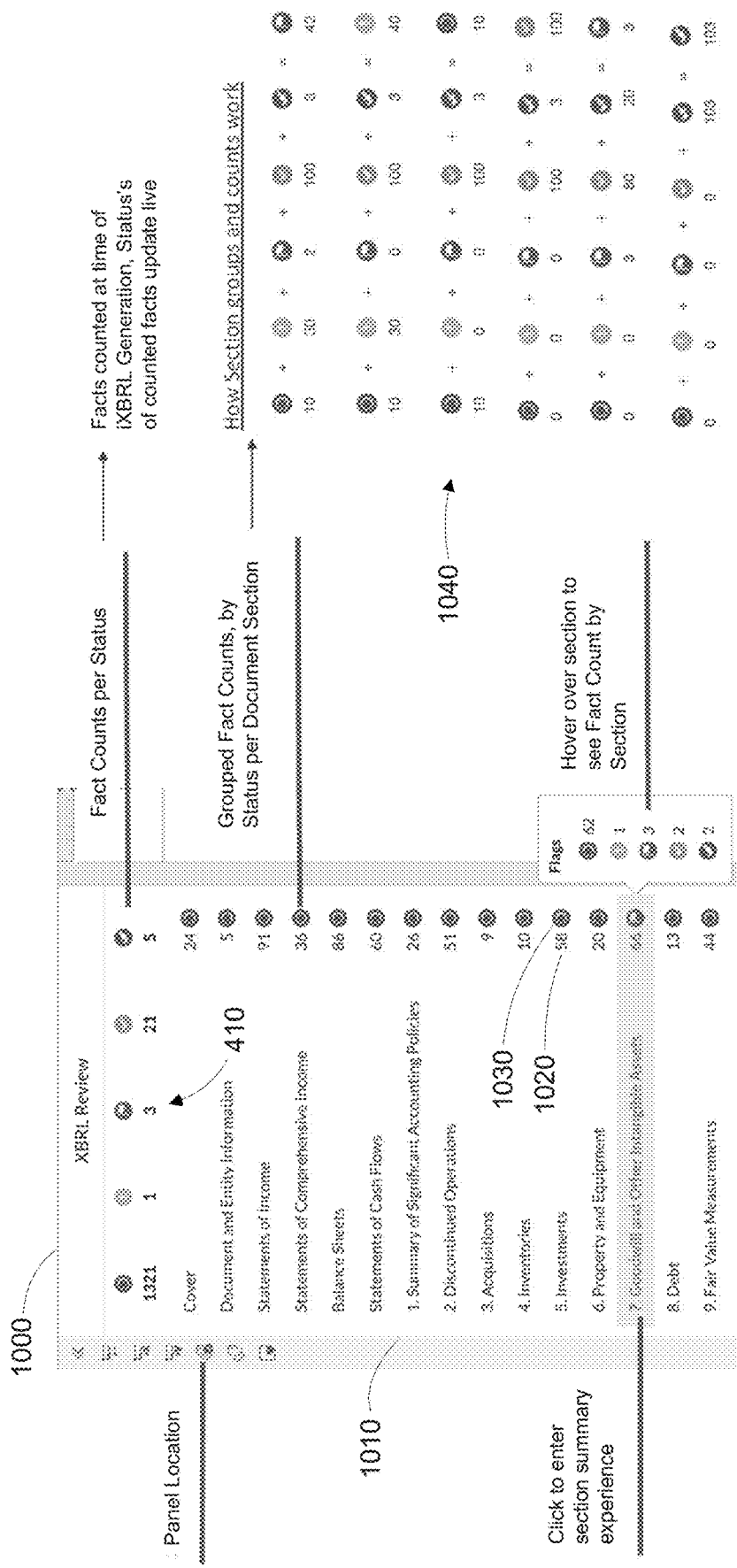
FIG. 10 is an example user interface showing an XBRL review panel, according to an embodiment.

FIG. 10 illustrates an example of an XBRL Review panel 1000 that may be displayed in a user interface, in one or more embodiments. As shown, the XBRL Review panel 1000 may identify the number of facts (e.g., XBRL fact 260) having each of the applied review statuses 410 in the most recent XBRL generation. Additionally, the XBRL Review panel 1000 may include an outline 1010 of the XBRL file or report (e.g., XBRL report 200) by section and identify the number of facts that are included in each section. In an example, the user can hover over the number of facts listed next to a particular section in the outline 1010 of the XBRL Review panel 1000 to get a more detailed breakdown of the facts in that section.

In an embodiment, the XBRL review system (e.g., XBRL review system 100) may display the facts count 1020 and facts status 1030 for a particular section by adhering to one or more display rules 1040. An example of such display rules 1040 is shown on the right side of FIG. 10.

Figure 11A:
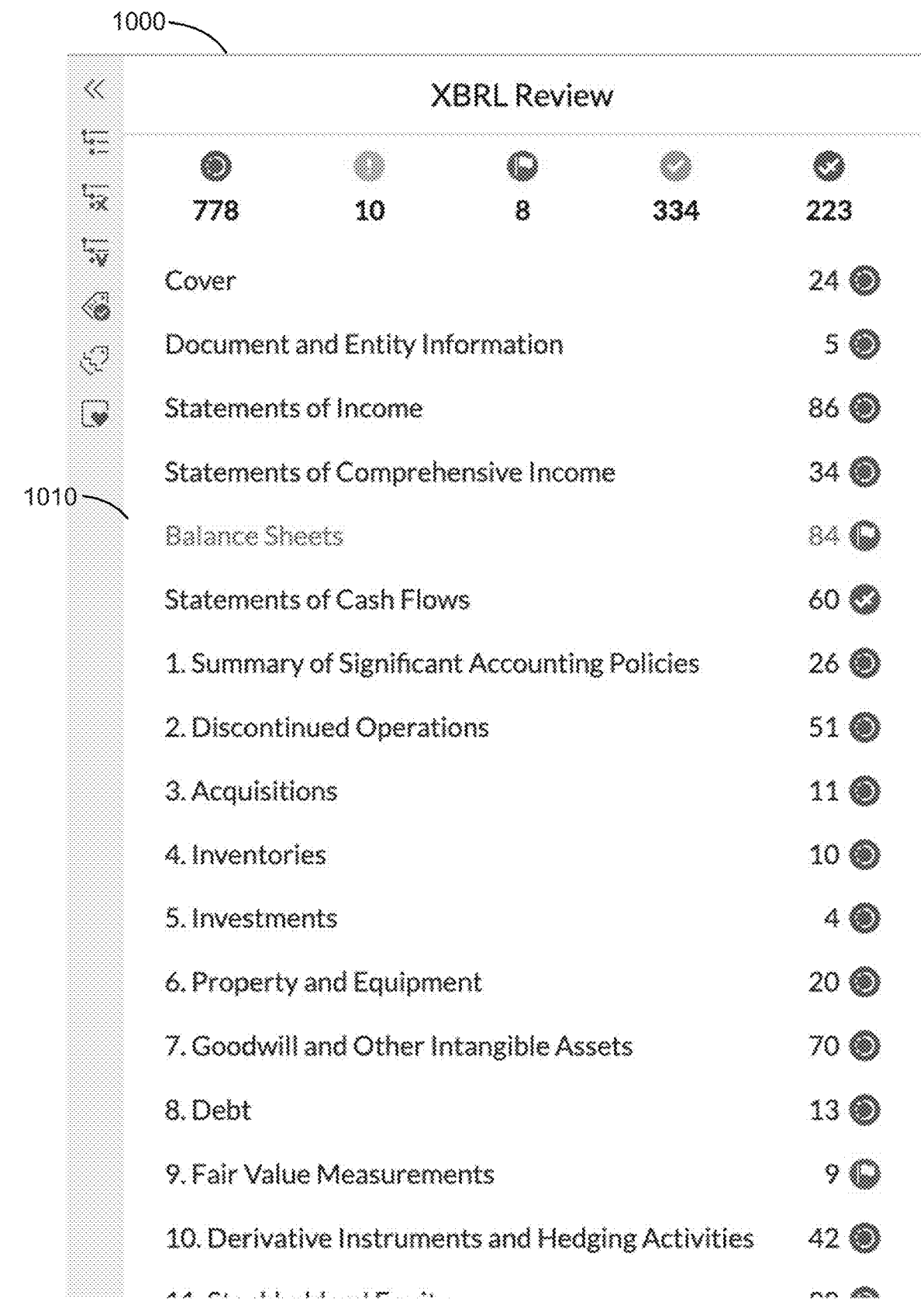
Figure 11B:
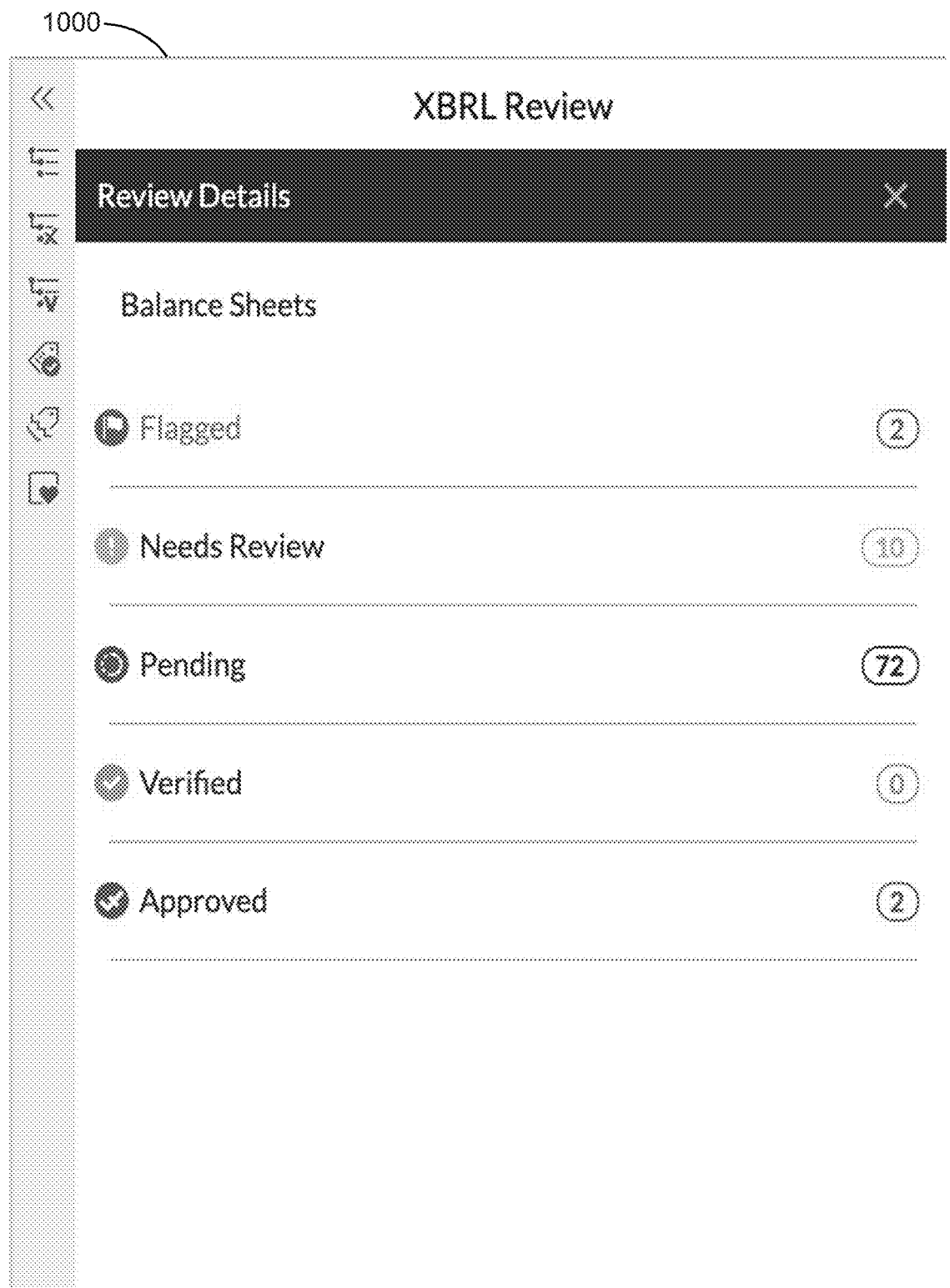
Figure 11C:
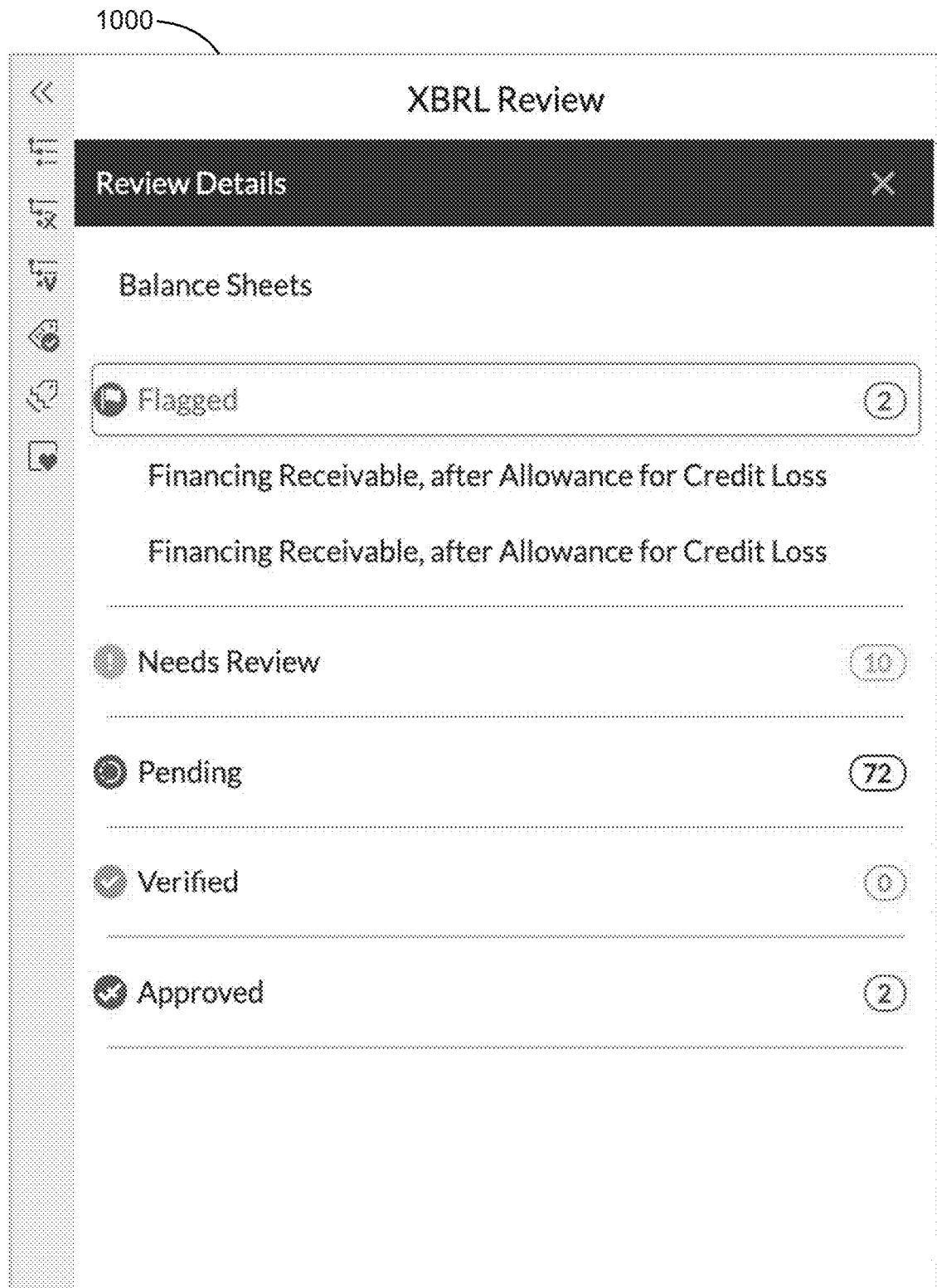

Each of the sections of the XBRL file outlined in the XBRL Review panel 1000 can be selected to get a further breakdown of the facts that are included in that section. An example of this is illustrated in FIGS. 11A-D. In the example shown in FIG. 11A, the "Balance Sheets" section is selected in the XBRL Review panel 1000. The "Balance Sheets" section is shown in FIG. 11A to include eight-four facts. Upon selecting the "Balance Sheets" section, a more detailed view of the eight-four facts included in that section is presented in the XBRL Review panel 1000. As shown in FIG. 11B, the eight-four facts included in this section are broken down into two facts with a review status of "flagged", ten facts with a review status of "needs review", seventy-two facts with a status of "pending", zero facts with a status of "verified", and two facts with a review status of "approved". As shown in FIG. 11C, by selecting any of the fact statuses (e.g., flagged, pending, etc.) in the breakdown of facts for the section, the user is presented with a list of the specific facts that are designated with that status. The user can then select any of the listed facts to see further details about the fact in the Fact Details panel 400, as shown in FIG. 11D.

Figure 12:
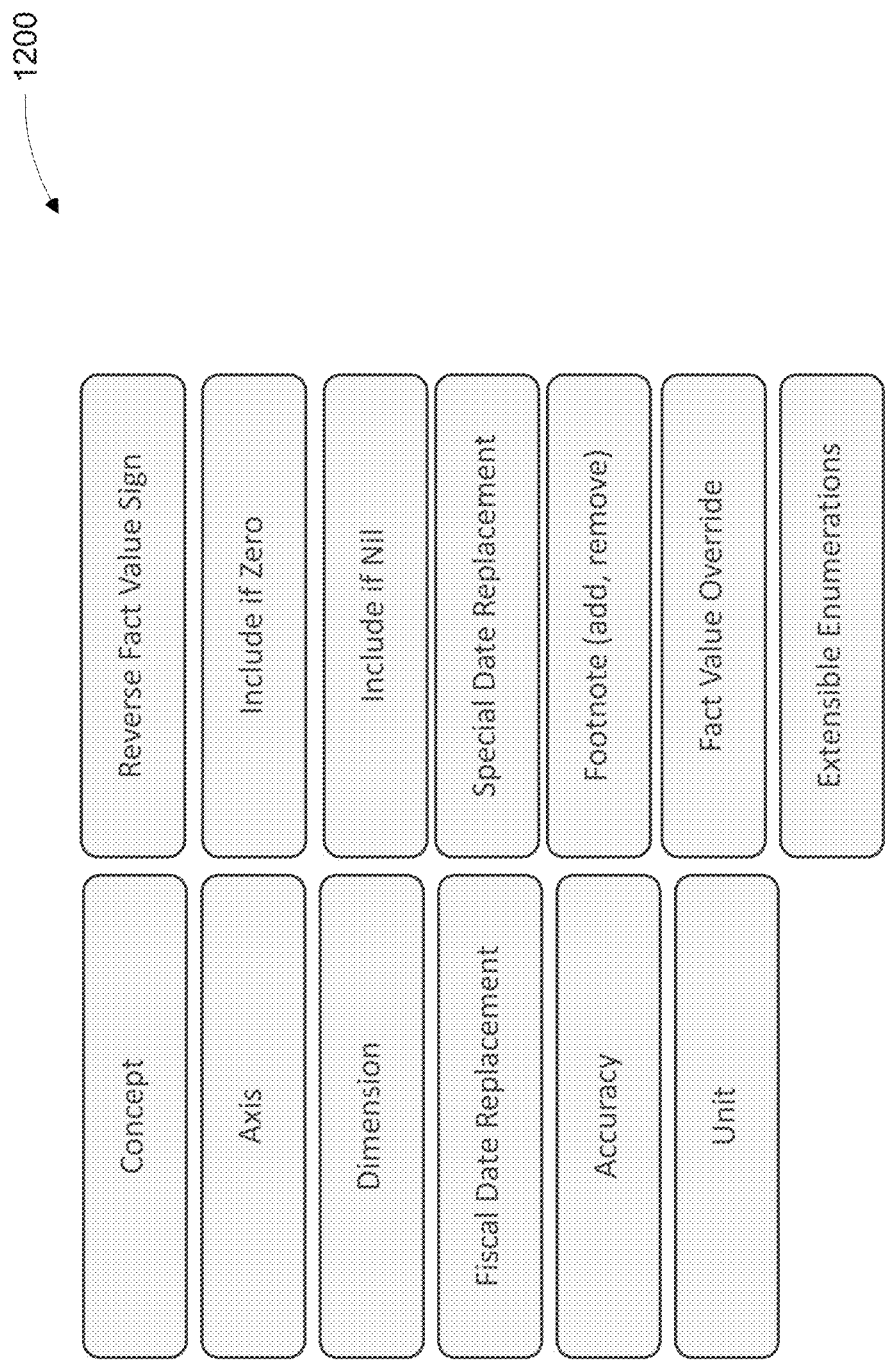
FIG. 12 is a diagram showing example tagging items that are monitored for changes, according to an embodiment.

In an embodiment, once a fact (e.g., XBRL fact 260) has been designated as "verified" or "approved", the system (e.g., XBRL review system 100) will monitor that fact for qualified changes and, when such a qualified change occurs, the system will update the review status for that fact to "needs review". In one embodiment, the system will monitor "verified" or "approved" facts for changes to one or more of the following tagging items 1200, which are illustrated in FIG. 12: concept, axis, dimension, fiscal date replacement, accuracy, unit, reverse fact value sign, include if zero, include if nil, special date replacement, add/remove footnote, fact value override, and extensible enumerations.

In an embodiment, when a fact that was previously designated as "verified" or "approved" is subsequently changed to "needs review" as a result of a change being made to the fact (e.g., to one or more components of the fact), the user is provided with the ability to view details about the change that was made. For example, by selecting a fact designated as "needs review" in the XBRL Review panel (e.g., XBRL Review panel 1000), the user is navigated directly to the Fact Details panel (e.g., Fact Details panel 400), which will give the user the ability to view the details of what has changed with respect to the fact. For example, the user may select a View Changes icon 1310 to view the details of what has changed with respect to the fact including, for example, when the change occurred, by whom the change was made, and the like. In an embodiment, the details of what has changed with respect to the fact may be presented to the user in a Change Details panel 1320, an example of which is shown in FIG. 13B. For example, for a fact that was previously verified or approved, and then is subsequently changed, the system may identify (e.g., highlight or otherwise designate) the component of that fact that was changed. An example of this is illustrated in FIG. 13A. This provides the user with an easy way to determine why the fact that they previously verified or approved is now appearing in the system as "needs review".

Figure 14:
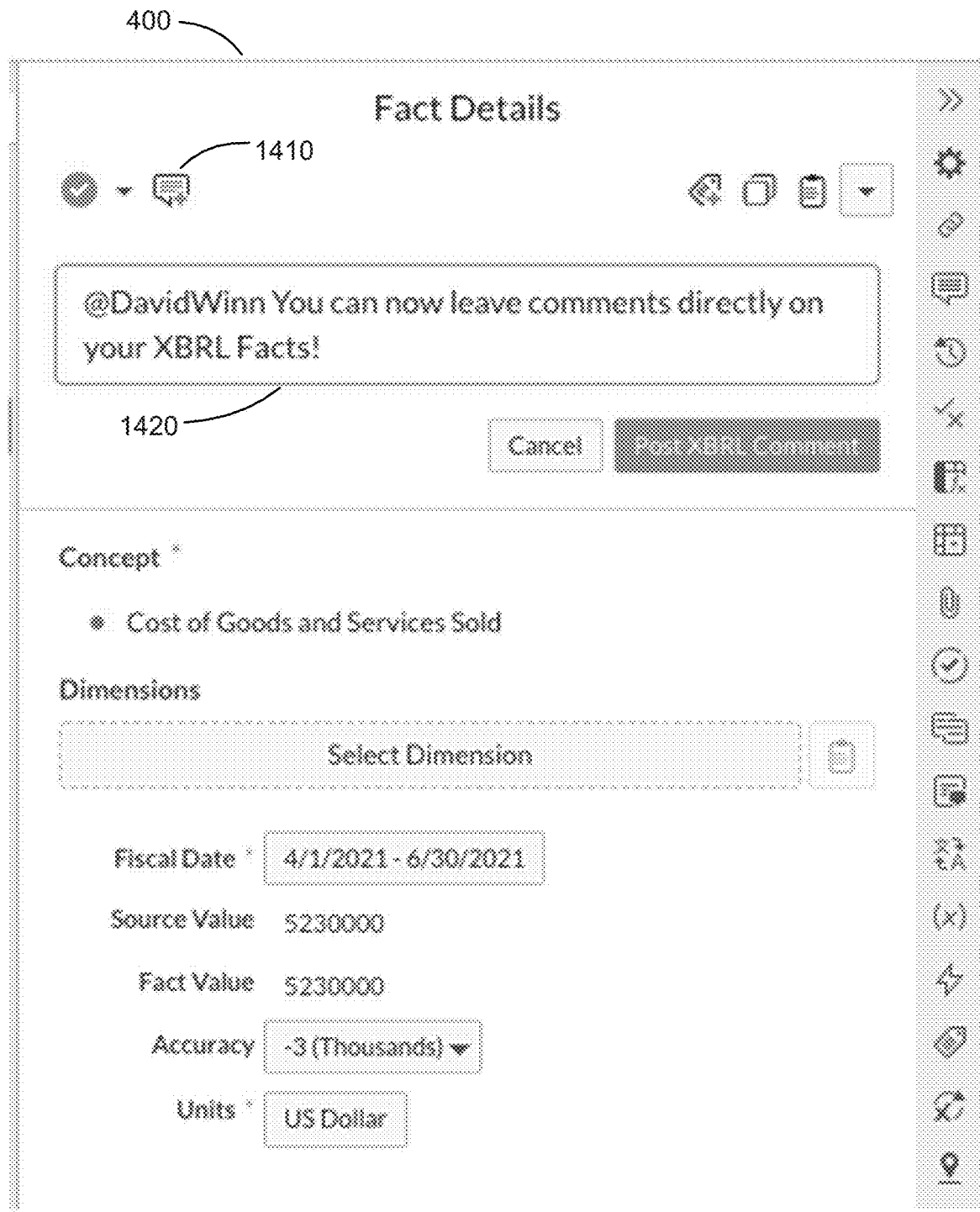
FIG. 14 is an example user interface showing a comment tool for commenting on an XBRL fact, according to an embodiment.
Figure 15:
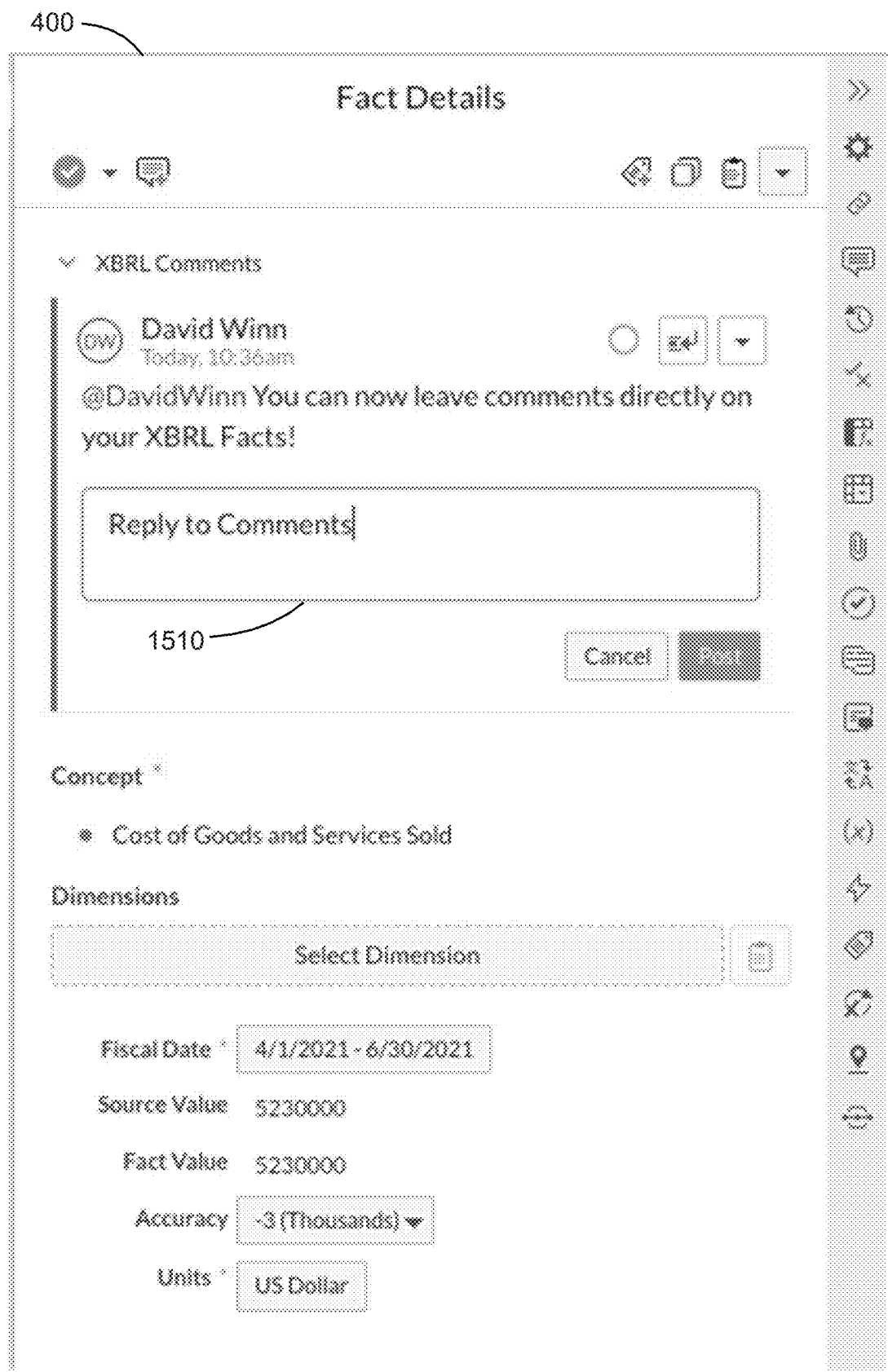
FIG. 15 is an example user interface showing a comment tool for replying to a comment on an XBRL fact, according to an embodiment.
Figure 16:
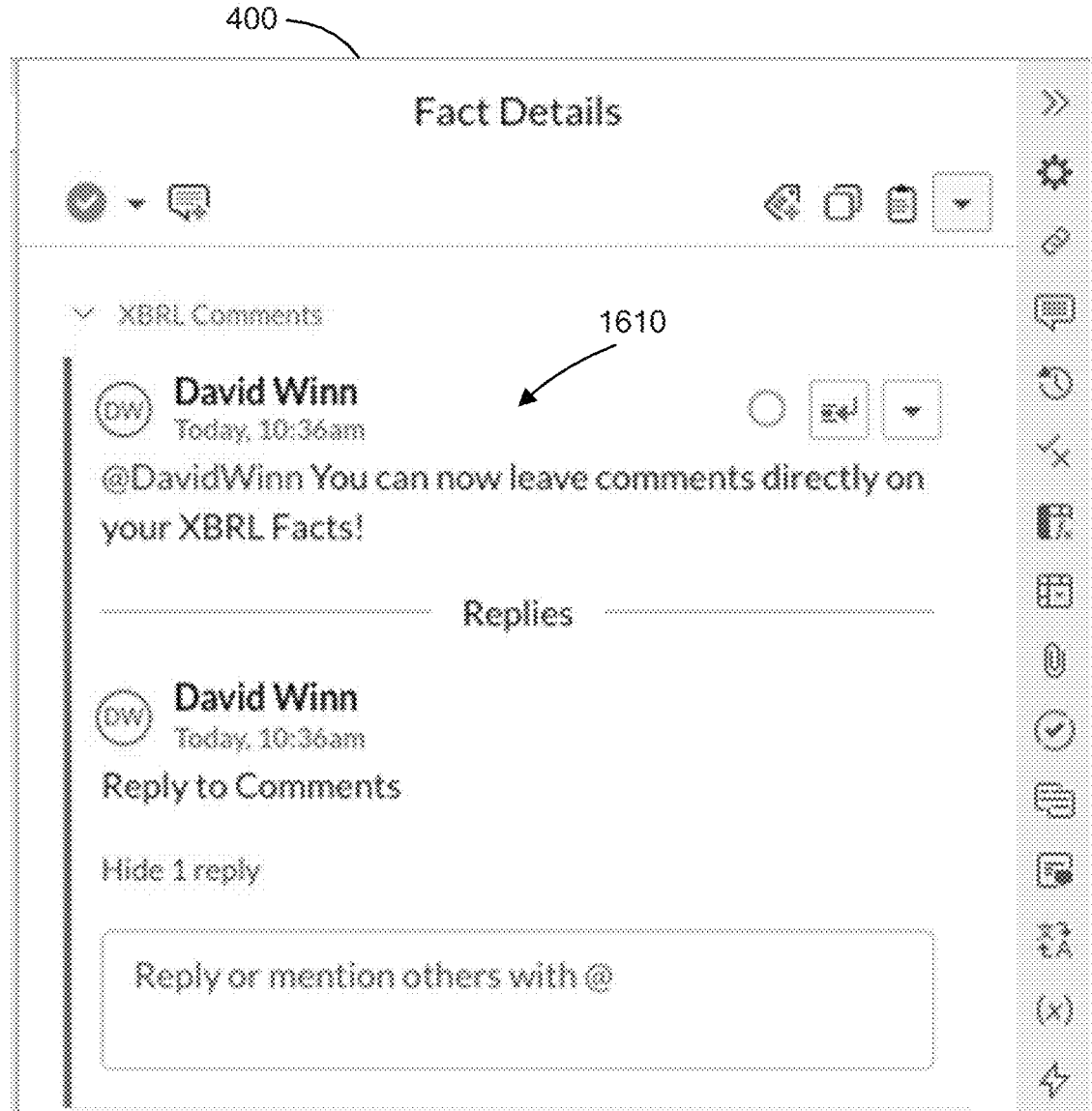
FIG. 16 is an example user interface showing how comments can be viewed for an XBRL fact, according to an embodiment.
Figure 17:
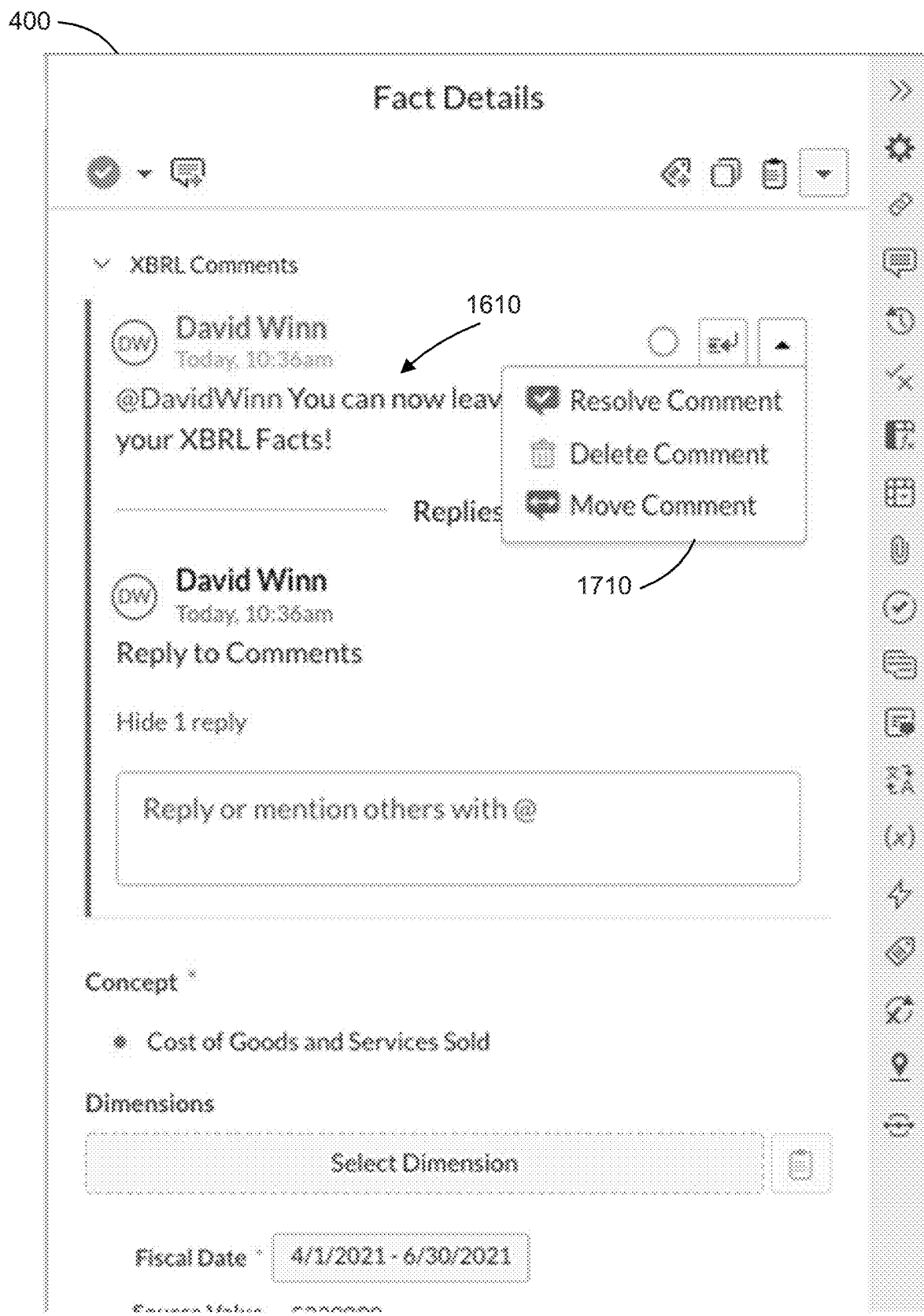
FIG. 17 is an example user interface showing how one or more actions can be taken on comments made for an XBRL fact, according to an embodiment.

In one or more embodiments, the XBRL review system (e.g., XBRL review system 100) includes commenting capability to foster collaboration among users. As shown in FIG. 14, the Fact Details panel 400 may include a comment tool (e.g., a selectable icon) 1420 that allows users to enter comments in a comment area 1420 within the Fact Details panel 400. In an example, such comments are posted directly on tagged XBRL facts within an XBRL Review. In an example, users may also send replies to comments 1510 made by other users, as shown in FIG. 15. As shown in FIG. 16, within the Fact Details panel 400, any XBRL comments 1610 that have been made by users can be easily collapsed and expanded. In an example, from within the Fact Details panel 400, a user can take one or more actions 1710 with respect to comments 1610 that have been made on an XBRL fact. For example, a user may resolve, delete, and/or move a comment 1610 that has been made on an XBRL fact, as shown in FIG. 17.

Figure 18:
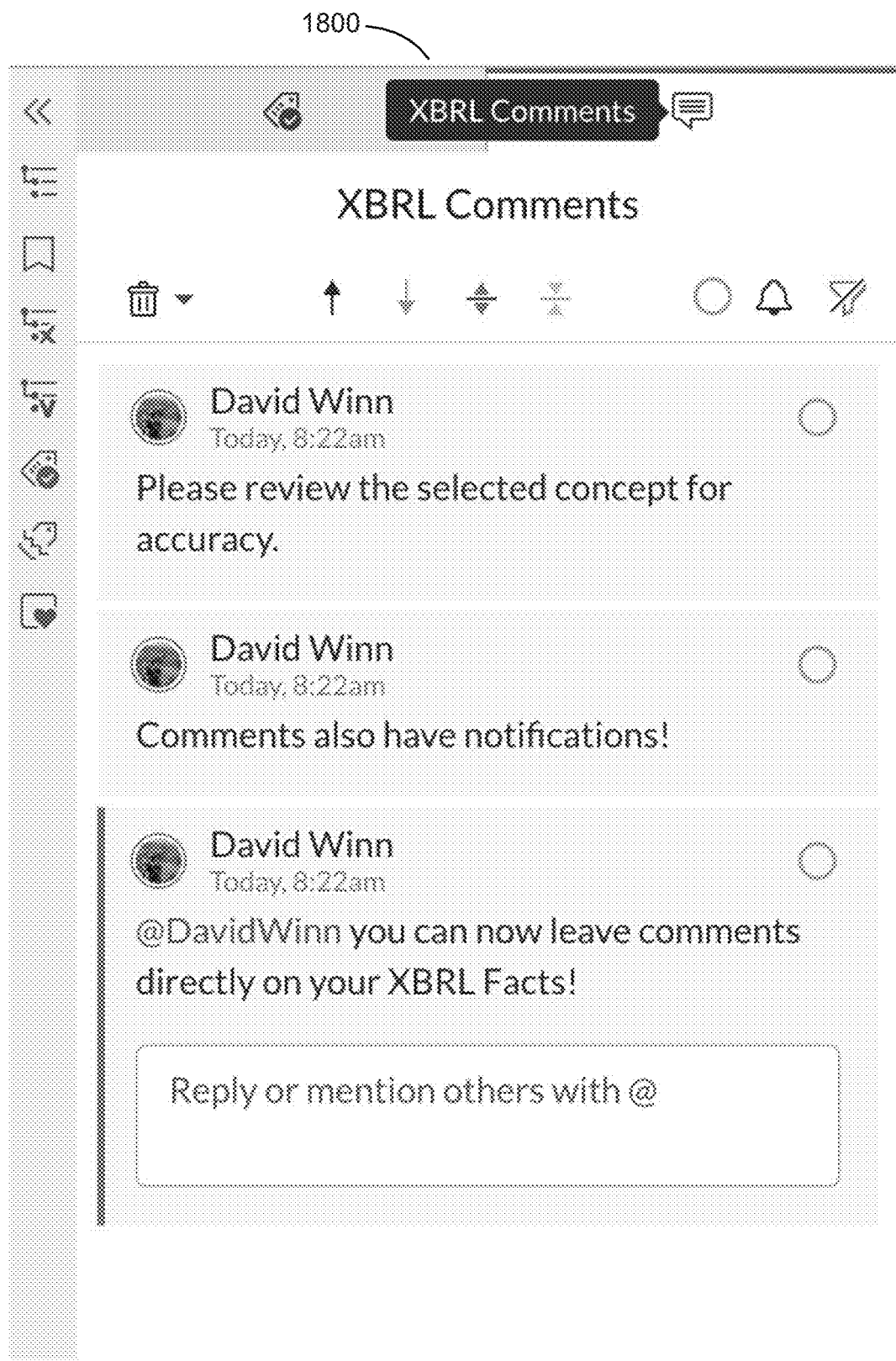
FIG. 18 is an example user interface showing a comments tab, according to an embodiment.
Figure 19:
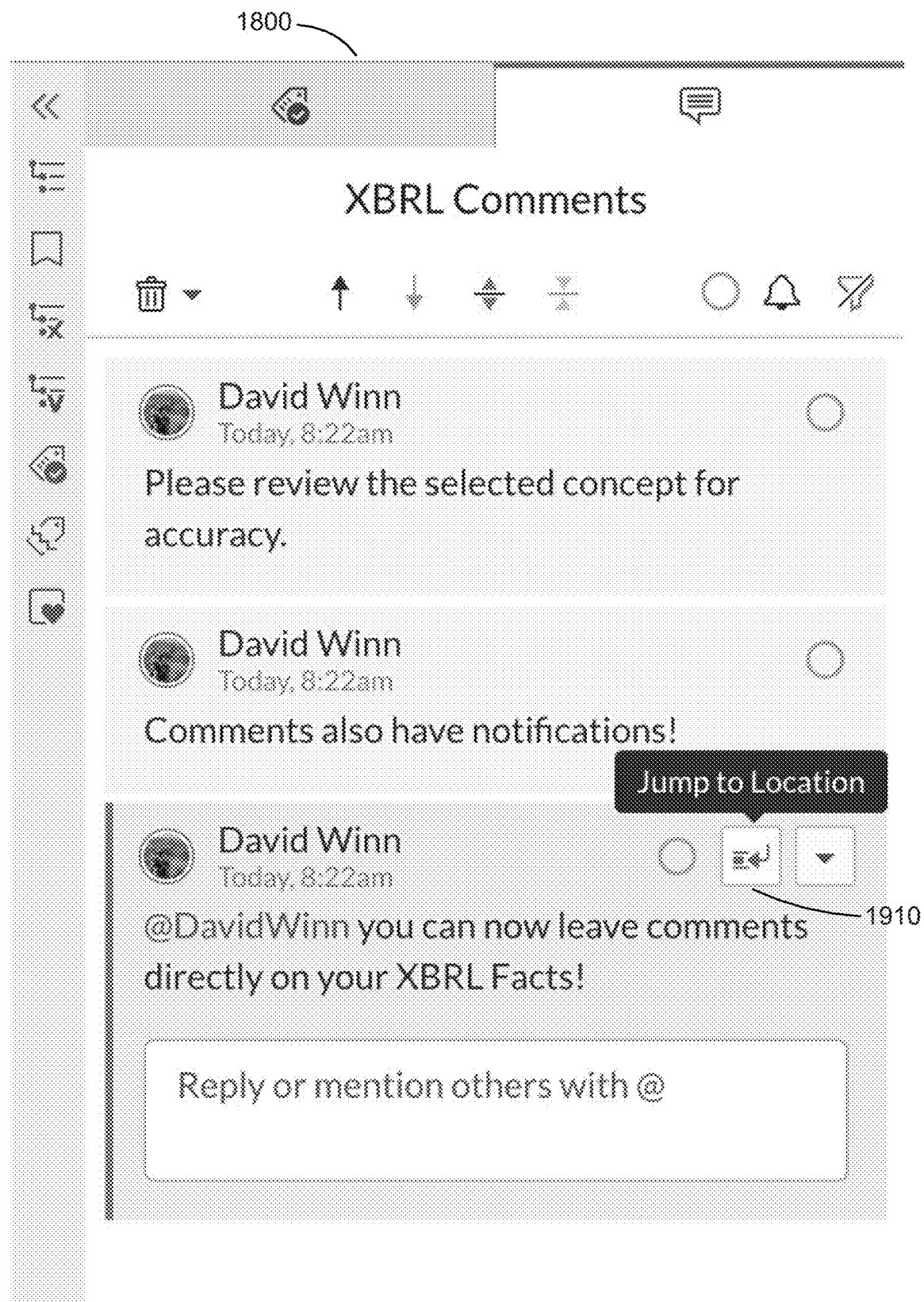
FIG. 19 is an example user interface showing how a user can navigate from a comment to the XBRL fact to which the comment relates, according to an embodiment.

In an embodiment, the XBRL Review system may include an XBRL Comments tab, which may be accessible via an XBRL Review panel (e.g., XBRL review panel 1000). An example XBRL Comments tab 1800 is shown in FIG. 18. As shown in FIG. 19, a user is provided with the ability to navigate 1910 from a comment directly to the relevant XBRL fact that the comment relates to. This allows for users to get a complete picture when reviewing a comment that is left by another user.

Figure 20:
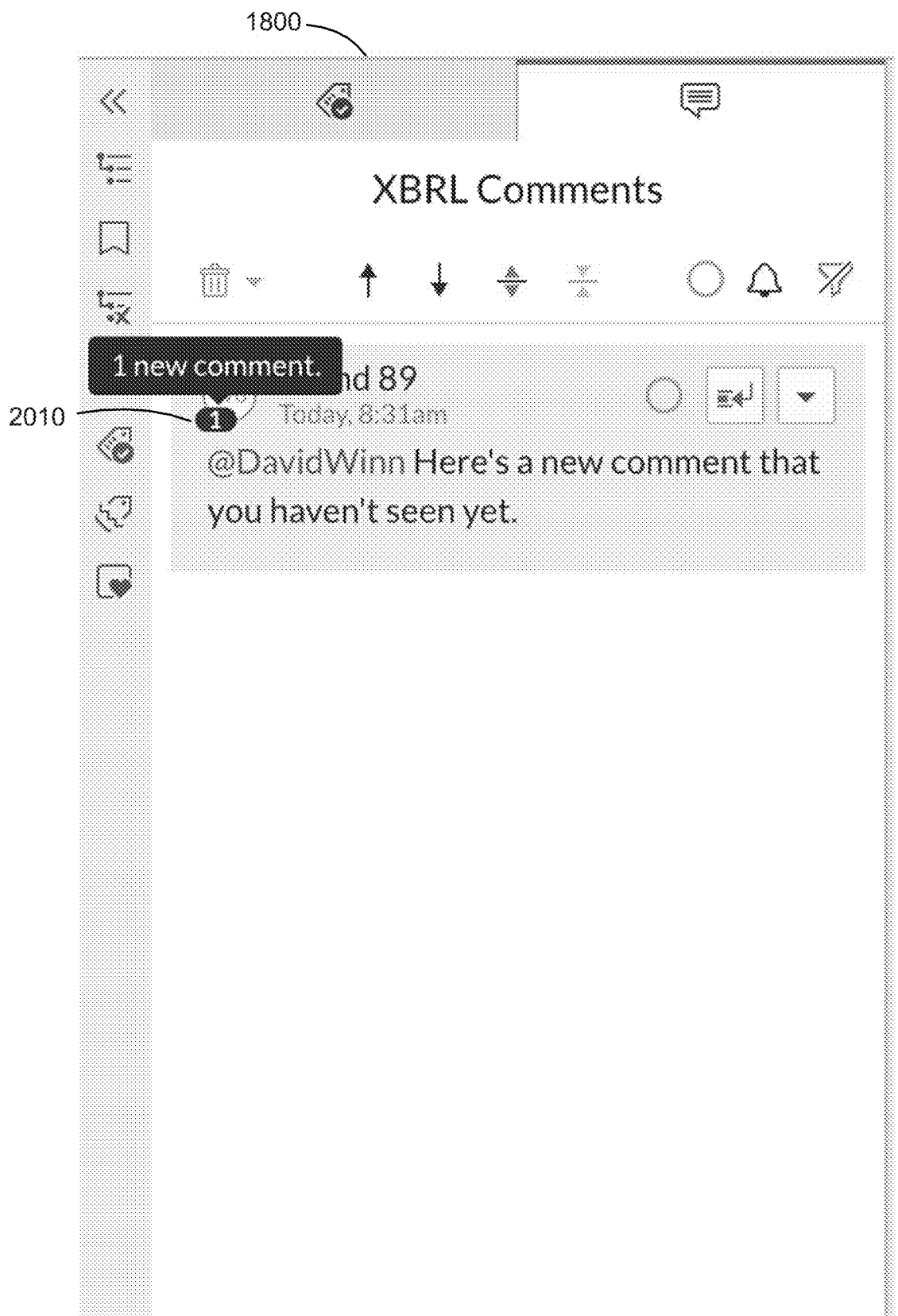
FIG. 20 is an example user interface showing comment indicators, according to an embodiment.
Figure 21:
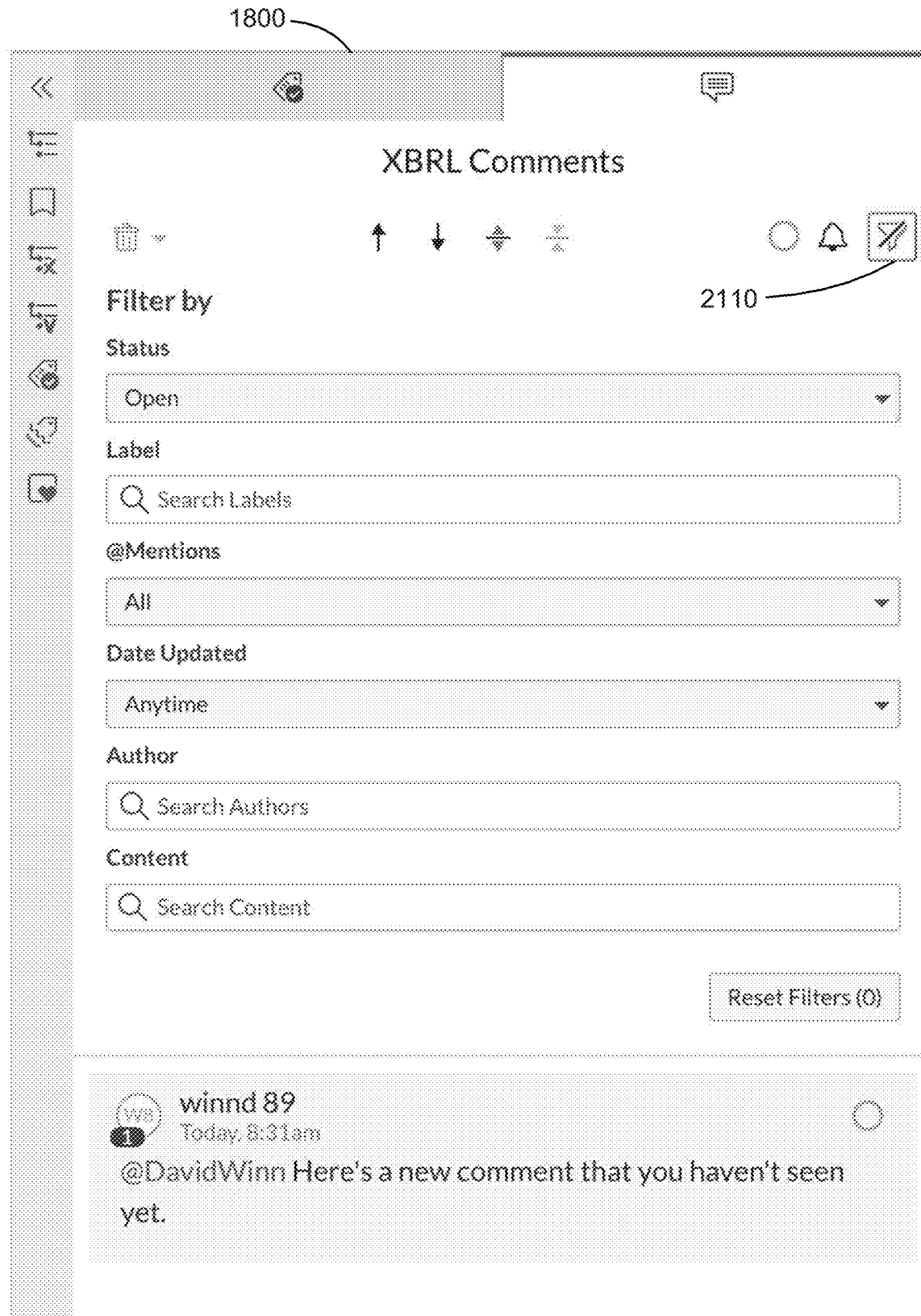
FIG. 21 is an example user interface showing a filtering tool for filtering comments made for an XBRL fact, according to an embodiment.
Figure 22:
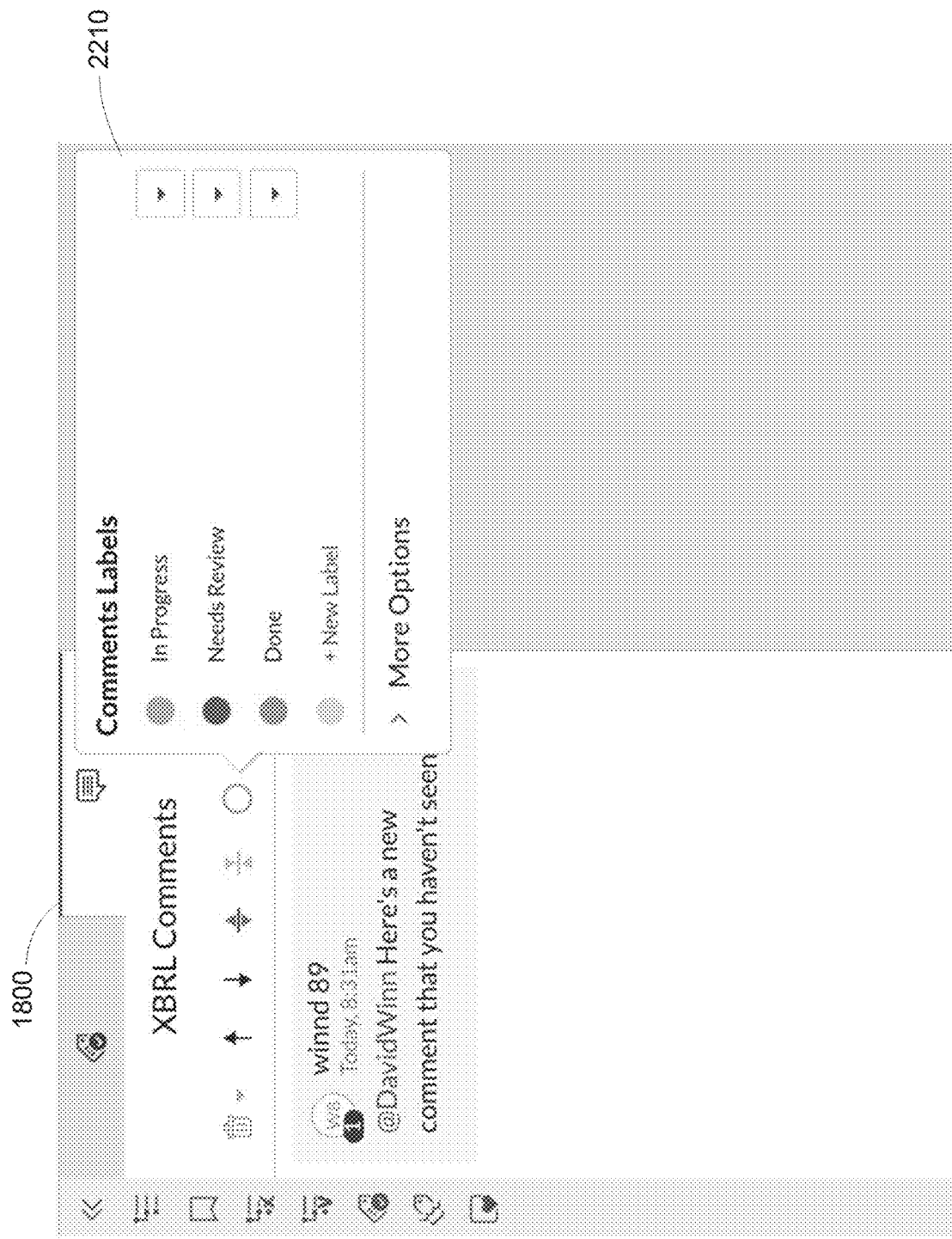
FIG. 22 is an example user interface showing labels that can be applied to comments made for an XBRL fact, according to an embodiment.
Figure 23:
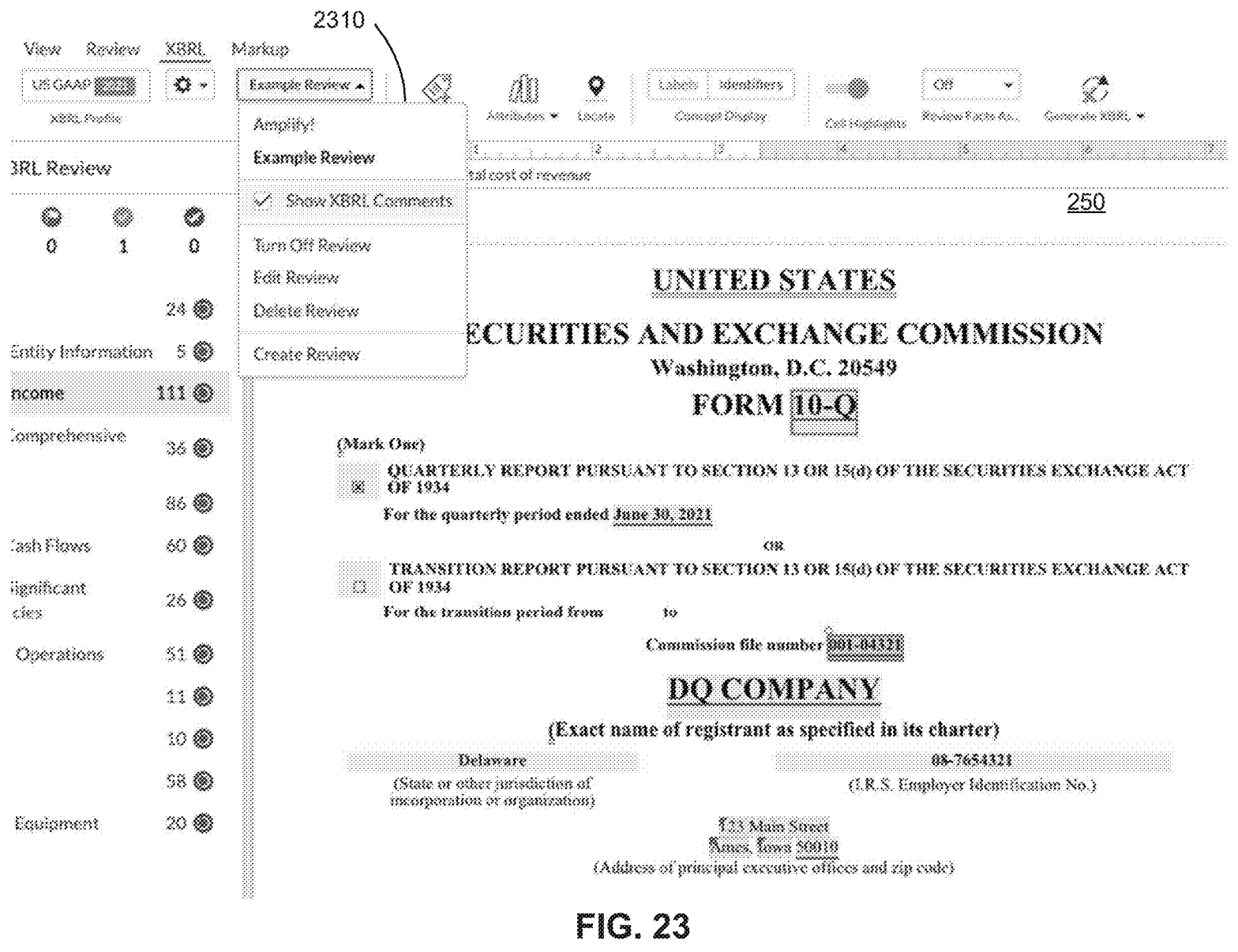

As shown in FIG. 20, in an embodiment, the XBRL Comments tab 1800 may include comment indicators 2010 to alert users when a new comment has been received. In an embodiment, the XBRL Comments tab 1800 may also include a filtering tool 2110 to allow for filtering comments (e.g., XBRL comments 1610) that have been made, as shown in FIG. 21. In an embodiment, XBRL comments may be applied labels 2210 to assist users in categorizing and keeping track of comments that have been made, as shown in FIG. 22. Additionally, in one example, the user is provided with the ability, via a selectable display option 2310, to configure whether comment indicators are to be shown or hidden within the XBRL document 250 when the XBRL review functionality is turned on. This ability to configure the display of comment indicators is shown in FIG. 23.

Figure 24:
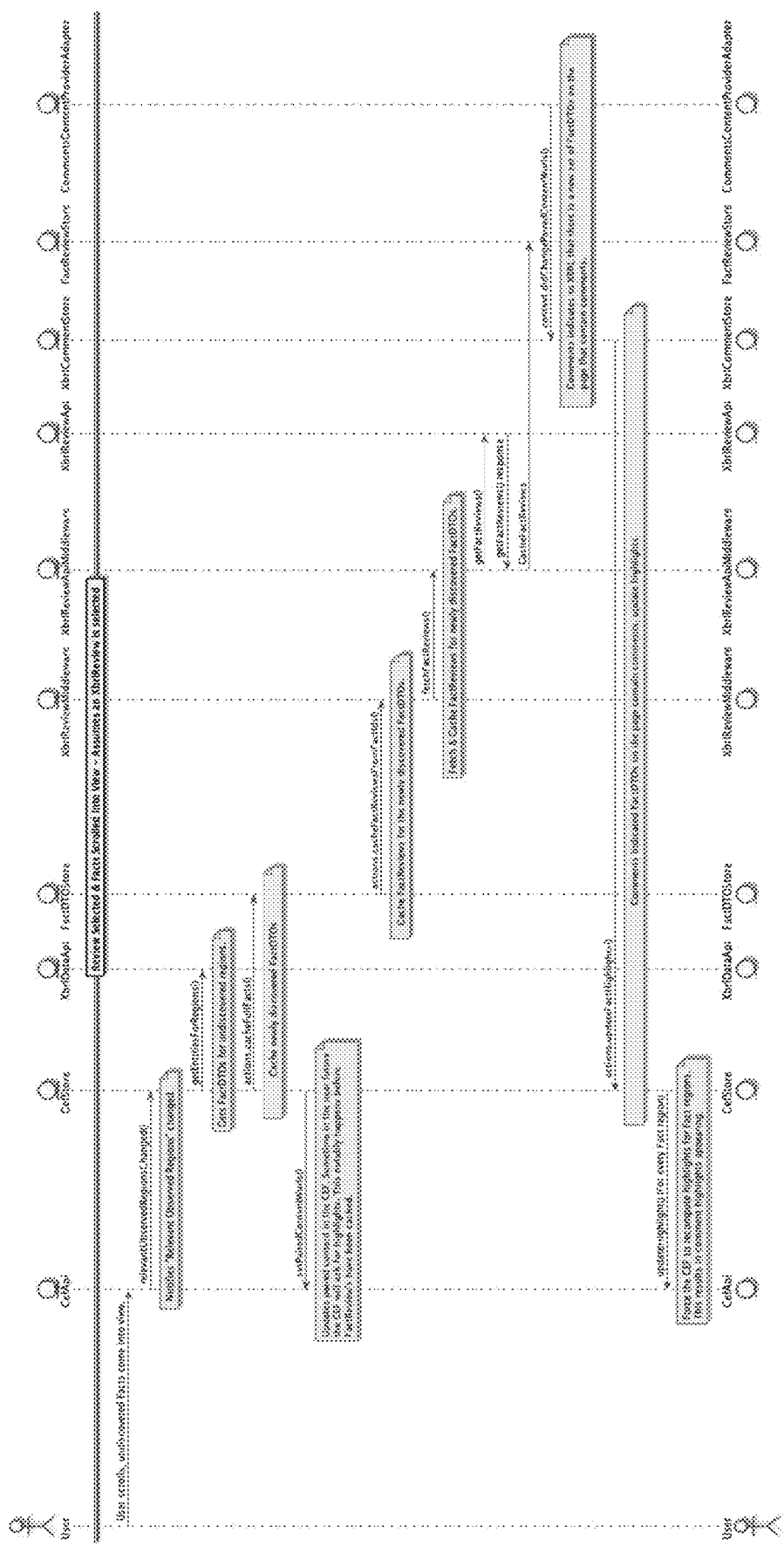
FIG. 24 is a diagram illustrating example data flows and operations associated with caching during XBRL fact reviews with a scrolling operation, according to an embodiment.
Figure 25:
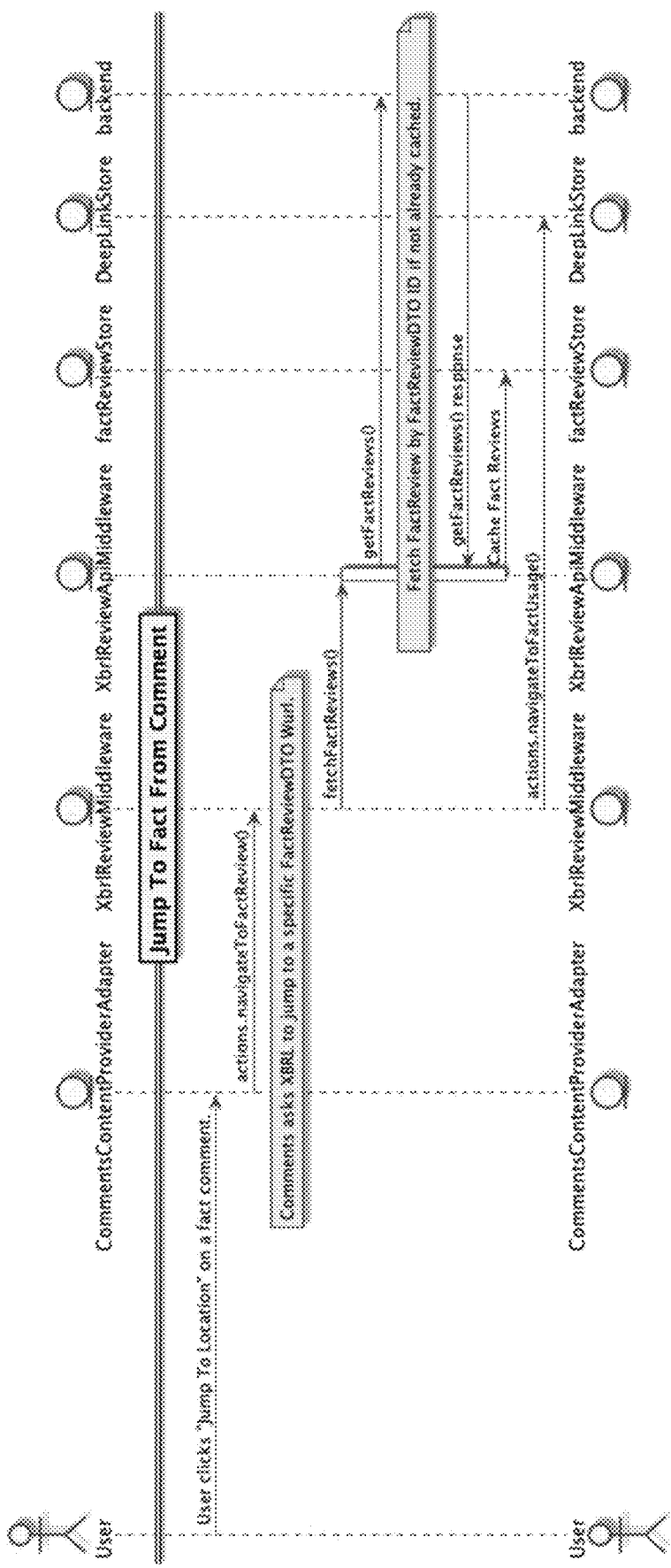
FIG. 25 is a diagram illustrating example data flows and operations associated with jumping to an XBRL fact from an XBRL comment on that fact, according to an embodiment.
Figure 26:
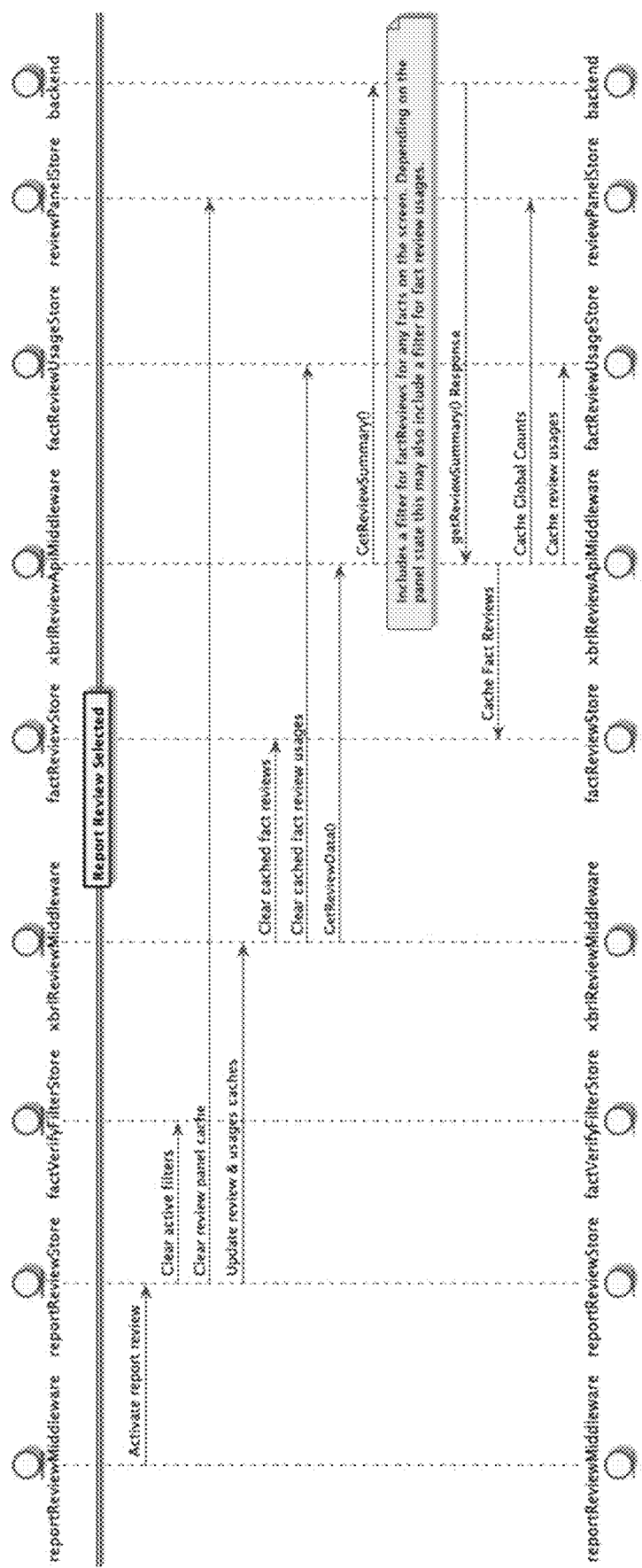
FIG. 26 is a diagram illustrating example data flows and operations associated with initiating an XBRL review of an XBRL report, according to an embodiment.
Figure 27:
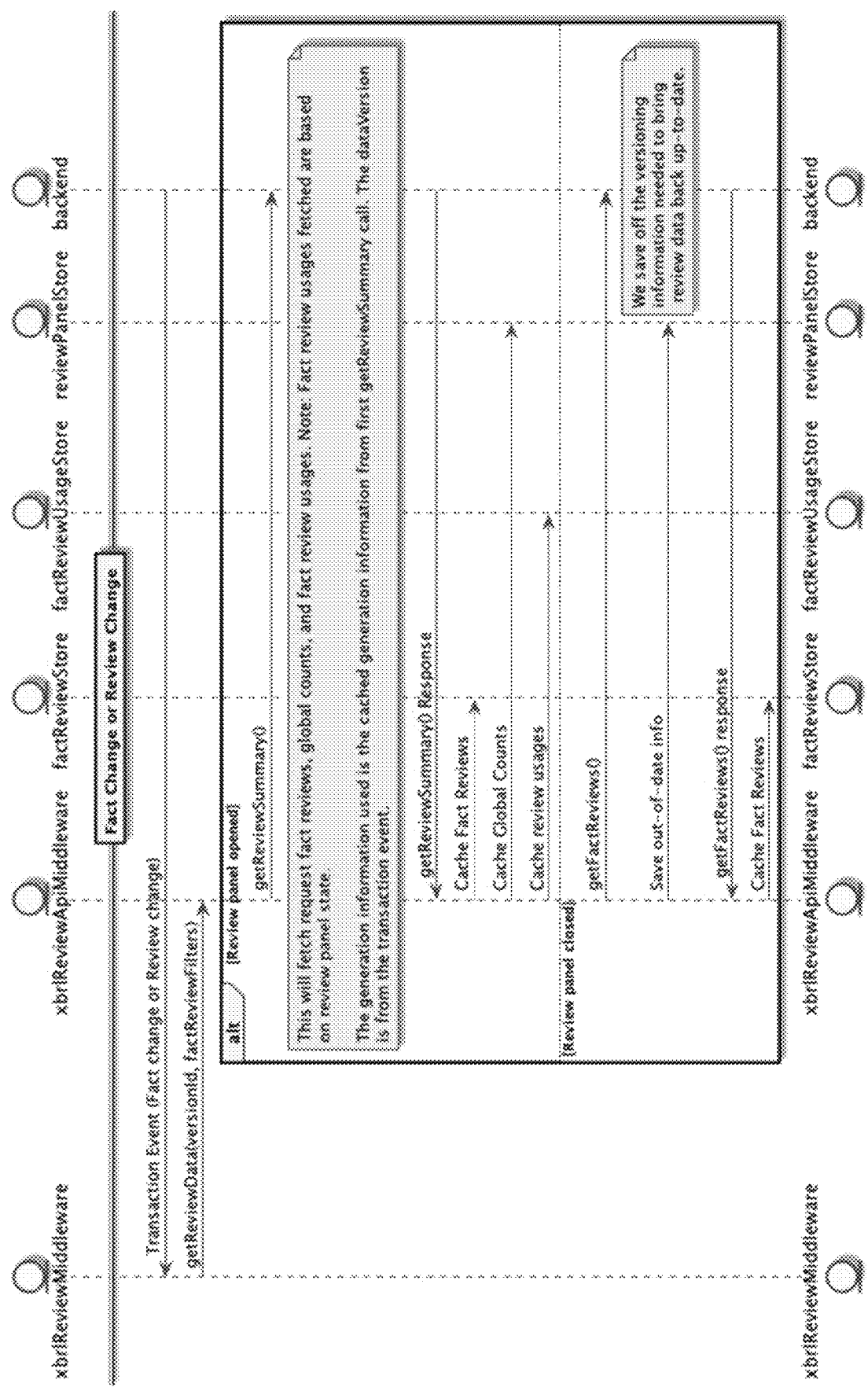
FIG. 27 is a diagram illustrating example data flows and operations associated with a transaction event, according to an embodiment.
Figure 28:
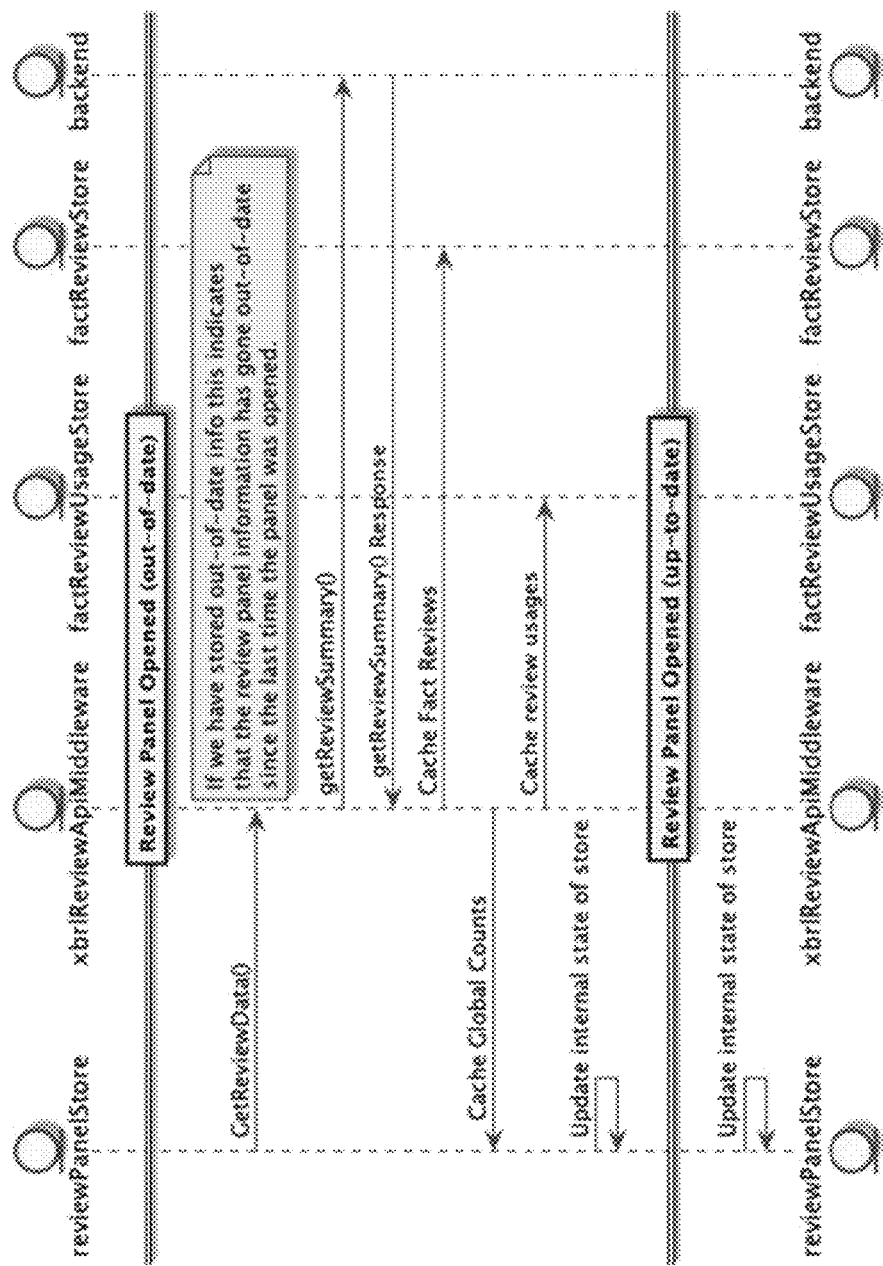
FIG. 28 is a diagram illustrating example data flows and operations associated with opening an XBRL review panel, according to an embodiment.
Figure 29:
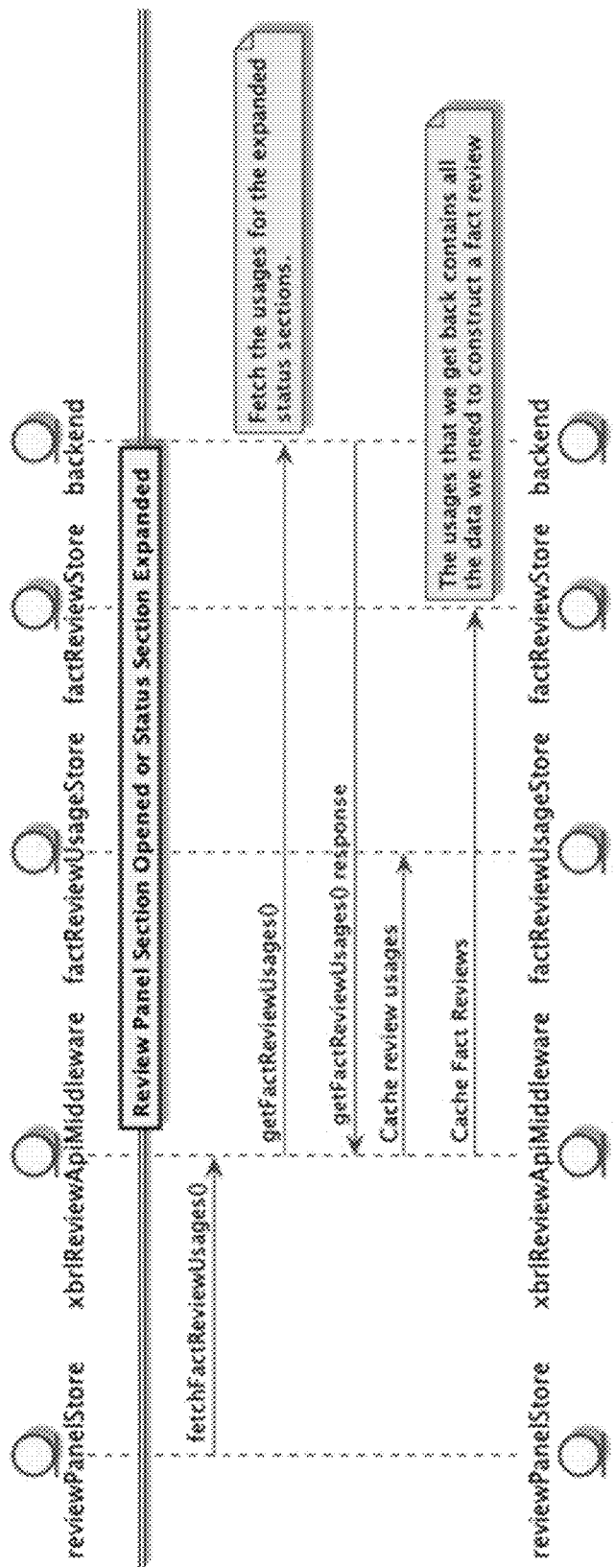
FIG. 29 is a diagram illustrating example data flows and operations associated with opening a section of an XBRL report within an XBRL review panel, according to an embodiment.

FIGS. 24-29 illustrate example data flows and operations for various backend processes in accordance with one or more embodiments. FIG. 24 illustrates example data flows and operations associated with caching during fact reviews with a scrolling operation. FIG. 25 illustrates example data flows and operations associated with jumping to a fact from an XBRL comment on that fact. FIG. 26 illustrates example data flows and operations associated with initiating an XBRL review of a report. FIG. 27 illustrates example data flows and operations associated with a transaction event, including, for example, a fact change and/or a review change. FIG. 28 illustrates example data flows and operations associated with opening an XBRL review panel. FIG. 29 illustrates example data flows and operations associated with opening a section of the XBRL review panel.

Figure 30:
FIG. 30 is flow diagram illustrating an example process for creating an XBRL review of an XBRL document, according to an embodiment.

FIG. 30 illustrates an example process for creating an XBRL review of an XBRL document, according to an embodiment. In an embodiment, the example process 3000 may be performed by an XBRL system (e.g., XBRL system 100 shown in FIG. 1), and one or more of the steps of the process 3000 may be performed by one or more of the components of the XBRL system 100.

At step 3010, an XBRL document is received. At step 3020, a request to create an XBRL review for the XBRL document is received. At step 3030, a selection of an XBRL fact included in the XBRL document is received. At step 3040, a first review status, of a plurality of review statuses, is applied to the XBRL fact selected in step 3030. At step 3050, the XBRL fact selected in step 3030 is monitored to detect a change to the XBRL fact. In response to detecting a change to the selected XBRL fact, at step 3060, the first review status applied to the XBRL fact is updated to a second review status.

Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method implemented on a computer system having one or more processors and memories, the method comprising:

receiving an XBRL document;
receiving a request to create an XBRL review for the XBRL document;
receiving a selection of an XBRL fact included in the XBRL document;
applying a first review status, of a plurality of review statuses, to the selected XBRL fact;
monitoring the selected XBRL fact to detect a change to the XBRL fact; and
in response to detecting a change to the XBRL fact, updating the first review status of the XBRL fact to a second review status of the plurality of review statuses.

2. The method of claim 1, further comprising:
receiving a selection of the XBRL fact with the second review status applied; and
in response to receiving the selection of the XBRL fact with the second review status applied, displaying details of the change to the XBRL fact.

3. The method of claim 2, wherein displaying details of the change to the XBRL fact comprises:
displaying a view of the XBRL fact prior to the detected change and a view of the XBRL fact after the detected change; and
identifying a component of the XBRL fact that was changed in the view of the XBRL fact after the detected change.

4. The method of claim 1, further comprising:
receiving a selection of a plurality of XBRL facts included in the XBRL document; and
displaying, for each of the plurality of review statuses, a number of the selected XBRL facts having that review status applied.

5. The method of claim 4, further comprising:
receiving a selection of one of the review statuses; and
filtering the selected XBRL facts according to the selected review status.

6. A computing device comprising a processor, wherein the processor is configured to carry out a method comprising:
receiving an XBRL document;
receiving a request to create an XBRL review for the XBRL document;
receiving a selection of an XBRL fact included in the XBRL document;
applying a first review status, of a plurality of review statuses, to the selected XBRL fact;
monitoring the selected XBRL fact to detect a change to the XBRL fact; and
in response to detecting a change to the XBRL fact, updating the first review status of the XBRL fact to a second review status of the plurality of review statuses.

7. The computing device of claim 6, the method carried out by the processor further comprising:
receiving a selection of the XBRL fact with the second review status applied; and
in response to receiving the selection of the XBRL fact with the second review status applied, displaying details of the change to the XBRL fact.

8. The computing device of claim 7, wherein displaying details of the change to the XBRL fact comprises:
displaying a view of the XBRL fact prior to the detected change and a view of the XBRL fact after the detected change; and
identifying a component of the XBRL fact that was changed in the view of the XBRL fact after the detected change.

9. The computing device of claim 6, the method carried out by the processor further comprising:
receiving a selection of a plurality of XBRL facts included in the XBRL document; and
displaying, for each of the plurality of review statuses, a number of the selected XBRL facts having that review status applied.

10. The computing device of claim 9, the method carried out by the processor further comprising:
receiving a selection of one of the review statuses; and
filtering the selected XBRL facts according to the selected review status.

11. The computing device of claim 6, the method carried out by the processor further comprising:
receiving a request to view the XBRL review that has been created for the XBRL document; and
displaying, for each of the plurality of review statuses, a number of XBRL facts in the XBRL document having that review status applied.

12. The computing device of claim 6, the method carried out by the processor further comprising:
receiving a selection of a first XBRL fact having the first review status applied;
receiving a selection of a second XBRL fact having the second review status applied; and
simultaneously updating the first review status of the first XBRL fact and the second review status of the second XBRL fact to a third review status, wherein the third review status is different from both the first and second review statuses.

13. The computing device of claim 6, the method carried out by the processor further comprising:
displaying an outline of the XBRL document, wherein the outline of the XBRL document identifies a plurality of sections of the XBRL document;
receiving a selection of a section of the XBRL document identified in the outline; and
displaying, for each of the plurality of review statuses, a number of XBRL facts included in the selected section of the XBRL document having that review status applied.

14. The computing device of claim 13, the method carried out by the processor further comprising:
receiving a selection of one of the displayed review statuses; and
displaying the XBRL facts in the selected section of the XBRL document having the selected review status applied.

* * * * *